(12) United States Patent
Branum et al.

(10) Patent No.: US 6,623,853 B2
(45) Date of Patent: *Sep. 23, 2003

(54) POLYETHYLENE GLYCOL MODIFIED POLYESTER FIBERS AND METHOD FOR MAKING THE SAME

(75) Inventors: James Burch Branum, Fort Mill, SC (US); Keith James Carnes, Concord, NC (US); Billy Mack Humelsine, Mooresville, NC (US); Carl Steven Nichols, Waxhaw, NC (US)

(73) Assignee: Wellman, Inc., Shrewsbury, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/801,853

(22) Filed: Mar. 8, 2001

(65) Prior Publication Data

US 2003/0134117 A1 Jul. 17, 2003

Related U.S. Application Data

(63) Continuation-in-part of application No. 09/761,446, filed on Jan. 17, 2001, and a continuation-in-part of application No. 09/141,665, filed on Aug. 28, 1998, now Pat. No. 6,294,254, said application No. 09/761,446, is a continuation-in-part of application No. 09/484,822, filed on Jan. 18, 2000, now Pat. No. 6,291,066, which is a continuation-in-part of application No. 09/444,192, filed on Nov. 19, 1999, now Pat. No. 6,454,982.

(51) Int. Cl.[7] .................................................. D02G 3/00

(52) U.S. Cl. ........................ 428/364; 528/272; 528/296; 528/300; 528/302; 528/308; 528/308.6; 525/437; 525/444; 428/357; 428/365; 428/373; 428/221; 428/292.1

(58) Field of Search .............................. 528/272, 296, 528/300, 302, 308, 308.6; 525/437, 444; 428/357, 364, 365, 373, 221, 292.1

(56) References Cited

U.S. PATENT DOCUMENTS

| | | |
|---|---|---|
| 2,623,031 A | 12/1952 | Snyder |
| 2,744,087 A | 5/1956 | Snyder |
| 3,461,468 A | 8/1969 | Morgan, Jr. et al. |

(List continued on next page.)

FOREIGN PATENT DOCUMENTS

| | | |
|---|---|---|
| EP | 0 595 185 A1 | 5/1994 |
| EP | 0 985 752 A | 3/2000 |
| GB | 2 021 652 A | 12/1979 |
| JP | 2-38421 A | 2/1990 |
| JP | 63-189388 | 2/1990 |
| JP | 03174076 A | 7/1991 |
| JP | 4041730 | 2/1992 |
| JP | 04041732 A | 2/1992 |
| JP | 04041738 A | 2/1992 |
| JP | 05295673 A | 11/1993 |
| JP | 2808829 B2 | 10/1998 |
| JP | 2932614 B2 | 8/1999 |
| RO | 82333 B | 9/1983 |
| RO | 83208 B | 1/1984 |
| WO | WO 92/13120 A1 | 8/1992 |
| WO | WO 99/19548 A | 4/1999 |
| WO | WO 00/12793 A1 | 3/2000 |
| WO | WO 01/36722 A1 | 5/2001 |
| WO | WO 01/36723 A1 | 5/2001 |

*Primary Examiner*—Samuel A. Acquah
(74) *Attorney, Agent, or Firm*—Summa Rallan, P.A.

(57) ABSTRACT

Disclosed is a method of copolymerizing polyethylene glycol (PEG) and branching agent into polyethylene terephthalate (PET) to achieve a polyethylene glycol-modified polyester composition that can be spun into filaments. Fabrics made from fibers formed from the copolyester composition possess wicking, dyeability, and tactility properties that are superior to those of fabrics formed from conventional polyethylene terephthalate fibers of the same yarn and fabric construction. Also disclosed are polyethylene glycol modified copolyester compositions, fibers, yarns, and fabrics.

133 Claims, 7 Drawing Sheets

Typical Trichromatic with Terasil Dyes:
Yellow W-6GS,
Red W-4BS,
Blue W-BLS

U.S. PATENT DOCUMENTS

| | | |
|---|---|---|
| 3,576,773 A | 4/1971 | Vaginay |
| 3,683,921 A | 8/1972 | Brooks et al. |
| 3,695,269 A | 10/1972 | Malaney |
| 3,775,373 A | 11/1973 | Wolfe, Jr. |
| 3,926,551 A | 12/1975 | Okada et al. |
| 4,002,171 A | 1/1977 | Taft |
| 4,035,441 A | 7/1977 | Endo et al. |
| 4,049,621 A | 9/1977 | Gilkey et al. |
| 4,084,622 A | 4/1978 | Nakagawa et al. |
| 4,092,299 A | 5/1978 | MacLean et al. |
| 4,113,704 A | 9/1978 | MacLean et al. |
| 4,167,395 A | 9/1979 | Engelhardt et al. |
| 4,207,230 A | 6/1980 | Bier et al. |
| 4,211,678 A | 7/1980 | Henry et al. |
| 4,548,856 A | 10/1985 | Ali Khan et al. |
| 4,587,154 A | 5/1986 | Hotchkiss et al. |
| 4,666,454 A | 5/1987 | DeMartino et al. |
| 4,704,329 A | 11/1987 | Hancock et al. |
| 4,705,525 A | 11/1987 | Abel et al. |
| 4,705,526 A | 11/1987 | Abel et al. |
| RE32,741 E | 8/1988 | Miyoshi et al. |
| 4,785,060 A | 11/1988 | Nagler |
| 4,795,771 A | 1/1989 | Yoshihara |
| 4,827,999 A | 5/1989 | Yabuki et al. |
| 4,851,291 A | 7/1989 | Vigo et al. |
| 4,908,238 A | 3/1990 | Vigo et al. |
| 4,925,722 A | 5/1990 | Jeffers et al. |
| 4,975,233 A | 12/1990 | Blaeser et al. |
| 4,983,450 A | 1/1991 | Yanagihara et al. |
| 5,009,651 A | 4/1991 | Kamishioiri et al. |
| 5,039,467 A | 8/1991 | Frazier |
| 5,064,599 A | 11/1991 | Ando et al. |
| 5,089,533 A | 2/1992 | Park |
| 5,089,553 A | 2/1992 | Umeda et al. |
| 5,091,504 A | 2/1992 | Blaeser et al. |
| 5,097,004 A | 3/1992 | Gallagher et al. |
| 5,114,788 A | 5/1992 | Nakagawa et al. |
| 5,171,308 A | 12/1992 | Gallagher et al. |
| 5,171,309 A | 12/1992 | Gallagher et al. |
| 5,178,945 A | 1/1993 | Kawamoto et al. |
| 5,223,317 A | 6/1993 | Corbin et al. |
| 5,234,720 A | 8/1993 | Neal et al. |
| 5,274,067 A | 12/1993 | Kressdorf et al. |
| 5,295,985 A | 3/1994 | Romesser et al. |
| 5,403,426 A | 4/1995 | Johnson et al. |
| 5,498,478 A | 3/1996 | Hansen et al. |
| 5,552,513 A | 9/1996 | Bhatia |
| 5,677,058 A | 10/1997 | Neal et al. |
| 5,695,375 A | 12/1997 | Takemura et al. |
| 5,709,940 A | 1/1998 | George et al. |
| 5,750,256 A | 5/1998 | Ito et al. |
| 5,807,796 A | 9/1998 | Degrand et al. |
| 5,820,973 A | 10/1998 | Dodge, II et al. |
| 5,834,582 A | 11/1998 | Sinclair et al. |
| 5,879,343 A | 3/1999 | Dodge, II et al. |
| 5,902,539 A | 5/1999 | Schmidt et al. |
| 5,962,131 A | 10/1999 | Schwind et al. |
| 5,976,694 A | 11/1999 | Tsai et al. |
| 5,994,615 A | 11/1999 | Dodge, II et al. |
| 6,013,275 A | 1/2000 | Konagaya et al. |
| 6,261,686 B1 | 7/2001 | Schumann |
| 6,291,066 B1 | 9/2001 | Branum |
| 6,294,254 B1 | 9/2001 | Nichols et al. |
| 6,303,739 B2 | 10/2001 | Branum |
| 6,322,886 B2 | 11/2001 | Branum |
| 6,399,705 B2 | 6/2002 | Branum |
| 6,454,982 B1 | 9/2002 | Branum |
| 6,485,829 B2 | 11/2002 | Nichols et al. |
| 6,509,091 B2 | 1/2003 | Branum et al. |
| 2001/0039160 A1 | 11/2001 | Carnes et al. |

100% Polyester Fabric Strength

—♦— 0% PEG —■— 4.5% PEG

Poly/Rayon Fabric Strength

◆ 0% PEG  ■ 4.5% PEG

POLYETHYLENE GLYCOL MODIFIED POLYESTER FIBERS AND METHOD FOR MAKING THE SAME

CROSS-REFERENCES TO RELATED APPLICATIONS

This application is a continuation-in-part of application Ser No. 09/141,665, filed Aug. 28, 1998, for Polyester Modified with Polyethylene Glycol and Pentaerythritol, now U.S. Pat. No. 6,294,254, and application Ser. No. 09/761, 446, filed Jan. 17, 2001, for Nonwoven Fabrics Formed from Polyethylene Glycol Modified Polyester Fibers and Method for Making The Sane, which is a continuation in part of application Ser. No. 09/484,822, filed Jan. 18, 2000, for Polyethylene Glycol Polyester Fibers and Method for Making the Same, now U.S. Pat. No. 6,291,066, which itself is a continuation-in-part of pending application Ser. No. 09/444,192, filed Nov. 19, 1999, for a Method of Preparing Polyethylene Glycol Modified Polyester Filaments, now U.S. Pat. No. 6,454,982. Each of these pending applications is commonly assigned with this application and is hereby incorporated entirely herein by reference.

FIELD OF THE INVENTION

The present invention relates to the production of polyethylene glycol (PEG) modified polyester compositions that are suitable for forming fibers. The present invention also relates to the making of yarns and fabrics from these copolyester fibers.

BACKGROUND OF THE INVENTION

Polyester filament is strong, yet lightweight, and has excellent elastic memory characteristics. Polyester fabric resists wrinkles and creases, retains its shape in garments, resists abrasions, dries quickly, and requires minimal care. Because it is synthetic, however, polyester is often considered to have an unacceptable appearance for garment purposes when the polyester is initially formed as a filament. Accordingly, polyester filaments require texturing to produce acceptable yarn and fabric characteristics with respect to appearance, hand, and comfort. Even then, polyester garments are often viewed unfavorably by consumers.

In pursuit of improved polyesters, various chemical modifications have been attempted to obtain desirable textile features. Unfortunately, some such treatments can produce unexpected or unwanted characteristics in the modified polyester. For example, polyethylene glycol enhances certain polyester properties, such as dye uptake, but diminishes other properties, especially those melt phase characteristics that are critical to filament spinning. Consequently, manufacturers have found that significant fractions of polyethylene glycol in copolyester can complicate-and even preclude-the commercial production of acceptable copolyester filaments. To gain commercial acceptance, modified polyesters must be compatible with commercial equipment with respect to melt-spinning, texturing, yarn spinning, fabric forming (e.g., weaving and knitting), and fabric finishing. This need for processing compatibility through conventional equipment has constrained the development of innovative polyester compositions.

To overcome the limitations of polyester compositions, polyester fibers are often blended with other kinds of fibers, both synthetic and natural. Perhaps most widely used in clothing are blended yarns and fabrics made of polyester and cotton. In general, blended fabrics of polyester and cotton are formed by spinning blended yarn from cotton fibers and polyester staple fibers. The blended yarns can then be woven or knitted into fabrics.

Cotton, like polyester, has certain advantages and disadvantages. Cotton is formed almost entirely of pure cellulose. Cotton fibers are typically about one inch long, but can vary from about one-half inch to more than two inches. Mature cotton fibers are characterized by their convolutions. Under a microscope, cotton appears as a twisted ribbon with thickened edges. Cotton is lightweight, absorbs moisture quickly and easily, and has a generally favorable texture (i.e., hand) when formed into fabrics. Cotton, however, lacks strength characteristics and elastic memory. Consequently, garments formed entirely of cotton require frequent laundering and pressing.

Blends of cotton and polyester fibers have found wide-ranging acceptance as they combine the desirable characteristics of each. Even so, there are continuing efforts to develop polyester filament, yarns, and fabrics that more closely resemble those of cotton, silk, rayon, or other natural fibers. One example is polyester microfibers, which are characterized by extremely fine filaments that offer exceptionally good aesthetics and hand, while retaining the benefits of polyester. Polyester microfibers, however, have proved to be difficult to dye because of their high degree of molecular orientation and crystallinity.

Accordingly, a need continues to exist for enhanced polyester compositions that have certain properties similar to those of cotton and other natural fibers, while retaining the advantages of polyester. One such composition and method for producing the same is disclosed by Nichols and Humelsine in commonly-assigned, pending U.S. patent application Ser. No. 09/141,665, filed Aug. 28, 1998, for Polyester Modified with Polyethylene Glycol and Pentaerythritol, now U.S. Pat. No. 6,294,254. U.S. patent application Ser. No. 09/141,665, which is incorporated entirely herein by reference, discloses a polyester composition that includes polyethylene terephthalate, polyethylene glycol, and chain branching agent in quantities sufficient to prepare a polyester composition that permits filament manufacture under substantially normal spinning conditions with a resulting filament that possesses physical characteristics superior to those of unmodified polyester filaments. As known to those familiar with the manufacture of filament, the equipment used to spin polyester filament is designed, built and adjusted to handle polymers whose melt viscosity falls within a certain range, typically between 500 and 4000 poise.

Another method for achieving enhanced polyester fibers is described by Branum in commonly-assigned, pending U.S. patent application Ser. No. 09/444,192, filed Nov. 19, 1999, for a Method of Preparing Polyethylene Glycol Modified Polyester Filaments, now U.S. Pat. No. 6,454,982. U.S. patent application Ser. No. 09/444,192, which, as noted, is incorporated entirely herein by reference, describes copolymerizing polyethylene glycol, which typically makes up between about 4 percent and 20 percent by weight of the resulting copolyester, into polyethylene terephthalate in the melt-phase to a relatively low intrinsic viscosity (i.e., a viscosity that will not support filameent spinning). The resulting PEG-modified polyester is then further polymerized in the solid phase until the copolyester is capable of achieving a melt viscosity sufficient to spin filaments. By introducing a solid state polymerization (SSP) step, this method reduces the need to add branching agents, such as pentaerythritol, to increase the melt-phase polymerization rate and thereby achieve an intrinsic viscosity that facilitates the spinning of filaments.

A related method for achieving enhanced polyester fibers is described by Branum in commonly-assigned, pending application Ser. No. 09/484,822, filed Jan. 18, 2000, for Polyethylene Glycol Modified Polyester Fibers and Method for Making the-Same, now U.S. Pat. No. 6,291,066. U.S. patent application Ser. No. 09/484,822, which is a continuation-in-part of the aforementioned application Ser. No. 09/444,192 and, as noted, is also incorporated entirely herein by reference, describes copolymerizing polyethylene glycol and branching agent into polyethylene terephthalate in the melt-phase to form a copolyester composition having an intrinsic viscosity of at least about 0.67 dl/g. Thereafter, copolyester filaments can be spun from the copolyester composition.

A related method for making nonwoven fabrics formed from such enhanced polyester fibers is described by Carnes and Branum in commonly-assigned, pending application Ser. No. 09/761,446, filed Jan. 17, 2001, for Nonwoven Fabrics Formed From Polyethylene Glycol Modified Polyester Fibers And Method For Making The Same. U.S. patent application Ser. No. 09/761,446, which is a continuation-in-part of the aforementioned application Ser. No. 09/484,822 and, as noted, is also incorporated entirely herein by reference, describes copolymerizing polyethylene glycol and branching agent into polyethylene terephthalate in the melt-phase or, alternatively in the solid-phase, to form a copolyester composition, which is then formed into copolyester fibers. Thereafter, copolyester fibers are formed into nonwoven fabrics.

With the exception of Ser. No. 09/141,665, these commonly-assigned applications relate to copolyester compositions having relatively low amounts of branching agent (e.g., below about 500 ppm pentaerythritol). In contrast, U.S. application Ser. No. 09/141,665 relates to copolyester compositions including branching agents in an amount sufficient to raise the melt viscosity of the composition to a level that permits filament manufacture under conditions that are substantially the same as those under which filament can be formed from unmodified polyethylene terephthalate.

Conventional wisdom suggests that high levels of branching agents can lead to excessive cross-linking, which in turn leads to relatively weaker filaments and textiles. There are instances, however, where weaker filaments are desirable. For example, pilling of polyester-containing fabrics has long been viewed as undesirable. As will be known by those familiar with fabrics, pills are small, twisted spheres of fiber that remain firmly attached to the fabric. Without being bound to a particular theory, it is thought that pilling in cotton/polyester blends occurs when the weaker cotton fibers break during wear, thereby loosening the fabric. The stronger polyester fibers then work their way out of the fabric to form pills at the fabric surface. It is believed that pilling can be reduced by using weaker polyester fibers. Unfortunately, weaker fibers also tend to break during filament spinning, thereby causing process disruptions.

OBJECT AND SUMMARY OF THE INVENTION

Therefore, it is an object of this invention to provide PEG-modified copolyester fibers possessing favorable characteristics similar to those possessed by natural fibers while retaining the advantages of polyester, and that can be formed into exceptionally comfortable woven, knit, and nonwoven fabrics.

Another object of the present invention is to provide a PEG-modified copolyester fiber that possesses superior wicking, drying, and dyeing characteristics as compared to commercially-available polyester fibers.

Yet another object of the present invention is to provide a PEG-modified copolyester composition that includes an amount of branching agent sufficient to provide viscosity properties suitable for spinning in commercial spinning equipment.

Yet another object of the present invention is to provide a method of copolymerizing polyethylene glycol into polyethylene terephthalate (PET) to achieve a PEG-modified copolyester composition that is readily spun into filaments.

As will be understood by those of ordinary skill in the art, modifying conventional polyesters with polyethylene glycol can improve certain polyester characteristics, yet can adversely affect others. For example, adding polyethylene glycol to polyethylene terephthalate improves wicking, but slows melt-phase polymerization kinetics. It also depresses melt viscosity and renders the processing of such PEG-modified copolyesters somewhat impractical in commercial polyester spinning operations.

Accordingly, in one aspect the invention is a modified copolyester composition that is suitable for use in commercial polyester spinning operations. This composition is particularly well-suited for forming fibers that can be formed into exceptionally comfortable fabrics. The fibers include polyethylene terephthalate in an amount sufficient for the copolyester fibers to possess dimensional stability properties substantially similar to those of conventional, unmodified polyethylene terephthalate fibers. The fibers also include polyethylene glycol in an amount sufficient for the copolyester fibers to possess wicking properties that are superior to those of conventional, unmodified polyethylene terephthalate fibers. Typically, the polyethylene glycol has an average molecular weight of less than about 5000 g/mol. The fibers also include a chain branching agent in an amount between than about 0.0014 and 0.0113 mole-equivalent branches per mole of standardized polymer, the standardized polymer being unmodified polyethylene terephthalate. Preferably, the copolyester fibers have a zero-shear melt viscosity of between about 1000 and 3500 poise when heated to 260° C.

In another aspect, the invention is a PEG-modified copolyester fiber formed of particular polymer chains. As before, this fiber can be formed into exceptionally comfortable fabrics that include polyethylene terephthalate in an amount sufficient for the copolyester fiber to possess dimensional stability properties substantially similar to those of conventional, unmodified polyethylene terephthalate fibers. The modified copolyester fiber also includes polyethylene glycol in an amount sufficient for the copolyester fiber to possess wicking properties that are superior to those of conventional, unmodified polyethylene terephthalate fibers. Preferably, polyethylene glycol has an average molecular weight of less than about 5000 g/mol. This modified copolyester fiber also includes a chain branching agent in an amount between about 0.0014 and 0.0113 mole equivalent branches per mole of standardized polymer, the standardized polymer being unmodified polyethylene terephthalate.

Preferably, this copolyester fiber primarily includes polymer chains formed from structural units consisting essentially of diol monomers, aromatic non-substituted diacid monomers, and branching agent monomers. The copolyester fiber has a zero-shear melt viscosity of between about 1000 and 3500 poise when heated to 260° C.

In another aspect, the invention is a nonwoven fabric formed of PEG-modified copolyester fibers, such as staple fibers or continuous filaments, that provide exceptional moisture management characteristics. As discussed previously, the copolyester fibers of this embodiment include polyethylene terephthalate, polyethylene glycol, and chain branching agent.

In another aspect the invention includes a PEG-modified copolyester composition that is particularly suitable for fibers. The composition includes polyethylene terephthalate in an amount sufficient for a fiber made from the composition to possess dimensional stability properties substantially similar to those of conventional unmodified polyethylene terephthalate fibers. The composition also includes polyethylene glycol in an amount sufficient for a fiber made from the composition to possess wicking properties that are superior to those of conventional, unmodified polyethylene terephthalate fibers, wherein the polyethylene glycol has an average molecular weight of less than about 5000 g/mol.

The copolyester composition also includes a chain branching agent that will copolymerize with polyethylene terephthalate, such as trifunctional alcohols, trifunctional acids, tetrafunctional alcohols, pentafunctional alcohols, pentafunctional acids, hexafunctional alcohols, or hexafunctional acids. The branching agent is present in the copolyester composition in an amount between about 0.0014 and 0.0113 mole equivalent branches per mole of standardized polymer, the standardized polymer being unmodified polyethylene terephthalate.

The composition preferably includes polymer chains formed from structural units consisting essentially of diol monomers, aromatic non-substituted diacid monomers, and branching agent monomers. Furthermore, the composition preferably achieves a zero-shear melt viscosity of between about 1000 and 3500 poise when heated to 260° C.

In yet another aspect, the invention is a method of preparing PEG-modified copolyester fibers that can be formed into exceptionally comfortable fabrics. The method includes copolymerizing polyethylene glycol and a chain branching agent into polyethylene terephthalate in the melt phase to form a copolyester composition having a zero-shear melt viscosity of between about 1000 and 3500 poise when heated to 260° C. The polyethylene terephthalate is present in the copolyester composition in an amount sufficient for fiber made from the copolyester composition to possess dimensional stability properties substantially similar to those of conventional, unmodified polyethylene terephthalate fibers. The polyethylene glycol has an average molecular weight of less than about 5000 g/mol and is present in an amount sufficient for a fiber made from the copolyester composition to possess wicking properties that are superior to those of conventional, unmodified polyethylene terephthalate fibers. The chain branching agent is present in the copolyester composition in an amount between about 0.0014 and 0.0113 mole equivalent branches per mole of standardized polymer, the standardized polymer being unmodified polyethylene terephthalate. Thereafter, the copolyester composition is spun into filaments.

In yet another aspect, the invention is a method of preparing PEG-modified copolyester fibers that can be formed with spandex fibers into exceptionally comfortable fabrics. The method includes copolymerizing polyethylene glycol and a chain branching agent into polyethylene terephthalate in the melt phase to form a copolyester composition that achieves a zero-shear melt viscosity of between about 1000 and 3500 poise when heated to 260° C. The polyethylene terephthalate is present in the copolymer composition in an amount sufficient for a fiber made from the copolyester composition to possess dimensional stability properties substantially similar to those of conventional, unmodified polyethylene terephthalate fibers. The polyethylene glycol has an average molecular weight of less than about 5000 g/mol and is present in an amount sufficient for a fiber made from the copolyester composition to possess wicking properties that are superior to those of conventional, unmodified polyethylene terephthalate fibers. The chain branching agent is present in the copolyester composition in an amount between about 0.0014 and 0.0113 mole equivalent branches per mole of standardized polymer, the standardized polymer being unmodified polyethylene terephthalate.

Thereafter, the method according to this embodiment includes forming copolyester fibers from the copolyester composition, blending the copolyester fibers with spandex fibers, and dyeing the blended copolyester fibers and the spandex fibers at a temperature of about 260° F. or less.

DETAILED DESCRIPTION

Definitions

Figure 1:
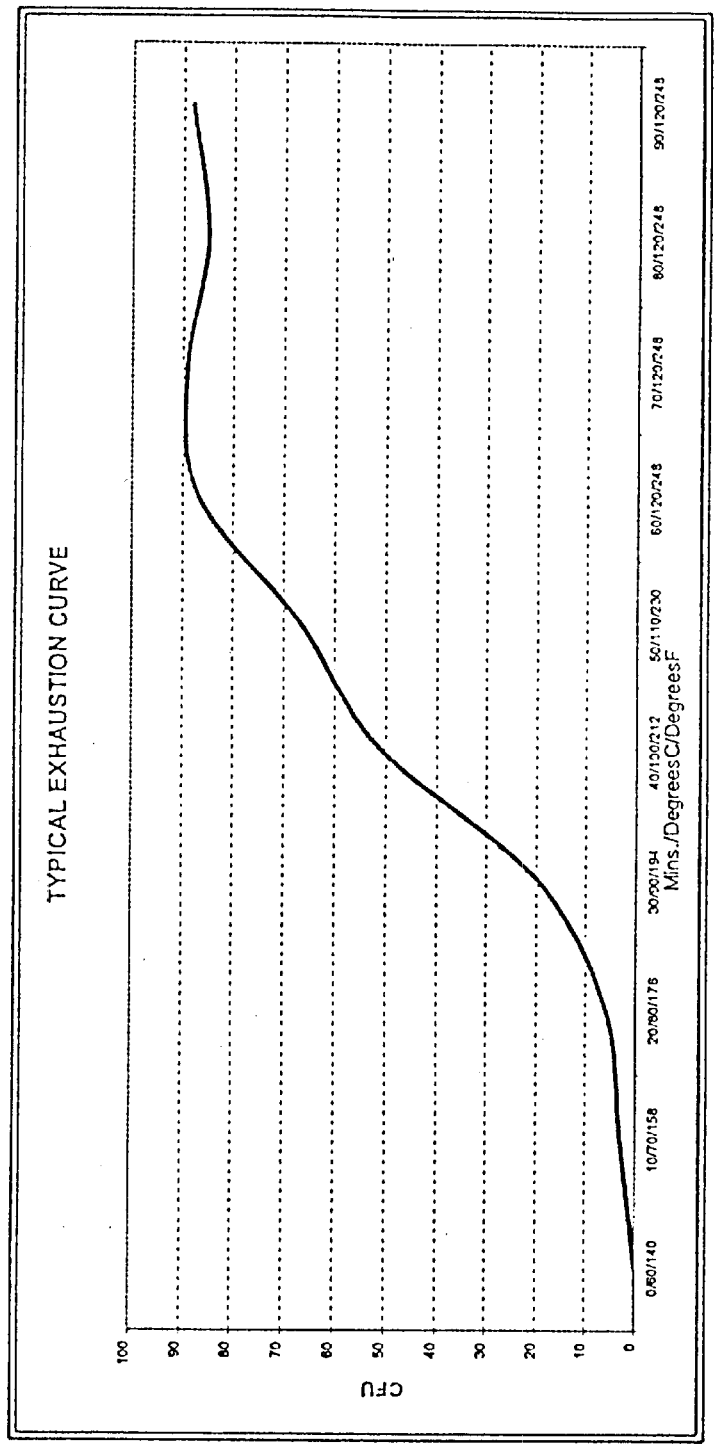
FIG. 1 depicts a typical exhaustion curve for fibers manufactured in accordance with the invention.

As used herein, the term "copolyester fiber" broadly refers to uncut filament (e.g., partially oriented yarn (POY), flat-drawn yarn, or textured yarn) and cut fiber (e.g., staple fiber). Although the term "copolyester filament" may include fibers, such as staple, that are subsequently cut from spun filament, it is generally used to refer to an extruded fiber of indefinite length. The meaning of the terms "copolyester fiber" and "copolyester filament" will be easily understood by those of ordinary skill in the art based on the contextual use of these terms.

Likewise, it will be understood by those familiar with textile terminology that the term "spinning" is used to refer to two different processes. In one sense, the term "pinning" refers to the production of synthetic polymer filaments from a polymer melt. In its older, conventional use, the term "spinning" refers to the process of twisting a plurality of individual fibers into yarns. The use of the term "spinning" is well-understood in the art based upon the context of its use.

The terms "melt viscosity" and "intrinsic viscosity" are used herein in their conventional sense. As used herein, the term "melt viscosity" refers to "zero-shear melt viscosity," unless indicated otherwise.

Melt viscosity represents the resistance of molten polymer to shear deformation or flow as measured at specified conditions. Melt viscosity is primarily a factor of intrinsic viscosity, shear, and temperature. The zero-shear melt viscosity at a particular temperature can be calculated by employing ASTM Test Method D-3835-93A to determine melt viscosities at several shear rates between about 35 sec$^{-1}$ and 4000 sec$^{-1}$, and thereafter extrapolating these melt viscosities to zero. In calculating zero-shear viscosity, it is recommended that several low shear rates (e.g., less than 100 sec$^{-1}$) be included to ensure that the extrapolation to zero is accurate.

Intrinsic viscosity is the ratio of the specific viscosity of a polymer solution of known concentration to the concentration of solute, extrapolated to zero concentration. Intrinsic viscosity is directly proportional to average polymer molecular weight. See, e.g., *Dictionary of Fiber and Textile Technology*, Hoechst Celanese Corporation (1990); Tortora & Merkel, *Fairchild's Dictionary of Textiles* (7$^{th}$ Edition 1996).

Both melt viscosity and intrinsic viscosity, which are widely recognized as standard measurements of polymer characteristics, can be measured and determined without undue experimentation by those of ordinary skill in this art. For the intrinsic viscosity values described herein, the intrinsic viscosity is determined by dissolving the copolyester in orthochlorophenol (OCP), measuring the relative viscosity of the solution using a Schott Autoviscometer (AVS Schott and AVS 500 Viscosystem), and then calculating the intrinsic viscosity based on the relative viscosity. See, e.g., *Dictionary of Fiber and Textile Technology* ("intrinsic viscosity").

In particular, a 0.6-gram sample (+/−0.005 g) of dried polymer sample is dissolved in about 50 ml (61.0–63.5 grams) of orthochlorophenol at a temperature of about 105° C. Fiber and yarn samples are typically cut into small pieces, whereas chip samples are ground. After cooling to room temperature, the solution is placed in the viscometer and the relative viscosity is measured. As noted, intrinsic viscosity is calculated from relative viscosity.

Finally, as used herein, average molecular weight refers to number-average molecular weight, rather than weight-average molecular weight.

PREFERRED EMBODIMENTS

The present invention incorporates into polyester fibers, as well as yarns and fabrics (e.g., woven, knitted, and nonwoven fabrics) formed from such polyester fibers, the favorable properties of polyethylene glycol, such as its outstanding wicking properties. The successful incorporation of polyethylene glycol is accomplished, in part, by the addition of a sufficient quantity of branching agent into a copolyester composition to achieve a suitable melt viscosity. This compensates for the tendency of higher fractions of polyethylene glycol to lower the melt viscosity of the copolyester. As will be understood by those of skill in the art, a low melt viscosity hinders the processing of copolyester through conventional spinning equipment.

In one aspect, the invention is a method of preparing PEG-modified copolyester fibers that can be formed into exceptionally comfortable woven and nonwoven fabrics having exceptional wicking, drying, and tactility characteristics. The method includes copolymerizing polyethylene glycol into polyethylene terephthalate in the melt phase to form a copolyester composition. The melt phase copolymerization of polyethylene glycol into polyethylene terephthalate preferably includes copolymerizing polyethylene glycol and a chain branching agent into polyethylene terephthalate in the melt phase to form a copolyester composition that achieves a zero-shear melt viscosity of between about 1000 and 3500 poise when heated to 260° C.

The polyethylene terephthalate is present in the copolyester composition in an amount sufficient for fibers made from the copolyester composition to possess dimensional stability properties substantially similar to those of conventional, unmodified polyethylene terephthalate fibers. The polyethylene glycol has an average molecular weight of less than about 5000 g/mol and is present in an amount sufficient for fibers made from the copolyester composition to possess wicking characteristics that are superior to those of conventional, unmodified polyethylene terephthalate fibers. Preferably, the weight fraction of polyethylene glycol in the fiber is between about 4 percent and 20 percent.

A chain branching agent is present in the copolyester composition in an amount less than about 0.0113 mole-equivalent branches per mole of standardized polymer, preferably between about 0.0014 and 0.0113 percent mole-equivalent branches per mole of standardized polymer, the standardized polymer being unmodified polyethylene terephthalate. Thereafter, the copolyester composition is spun into copolyester filaments, the copolyester filaments are formed (e.g., cut) into staple fibers, and the staple fibers are formed into woven, knitted, and nonwoven fabrics. Alternatively, the copolyester filaments can be formed into nonwoven fabrics, such as by melt-spun bonding or melt blowing, or into yarns, which themselves may be formed into fabrics (e.g., knit and woven fabrics).

As used herein, the term "branching agent" refers to a multifunctional monomer that promotes the formation of side branches of linked monomer molecules along the main polymer chain. See Odian, *Principles of Polymerization*, pp. 18–20 (Second Edition 1981). The chain branching agent is preferably selected from the group consisting of trifunctional, tetrafunctional, pentafunctional and hexafunctional alcohols or acids that will copolymerize with polyethylene terephthalate. As will be understood by those skilled in the art, a trifunctional branching agent has one reactive site available for branching, a tetrafunctional branching agent has two reactive sites available for branching, a pentafunctional branching agent has three reactive sites available for branching and a hexafunctional branching agent has four reactive sites available for branching.

Acceptable chain branching agents include, but are not limited to, trimesic acid ($C_6H_3(COOH)_3$), pyromellitic acid ($C_6H_2(COOH)_4$), pyromellitic dianhydride, trimellitic acid, trimellitic anhydride, trimethylol propane ($C_2H_5C(CH_2OH)_3$), ditrimethytlol propane ($C_2H_5C(CH_2OH)_2C_2H_4OC(CH_2OH)_2C_2H_5$), dipentaerythritol ($CH_2OHC(CH_2OH)_2C_2H_4OC(CH_2OH)_2CH_2OH$), pentaerythritol ($C(CH_2H)_4$), ethoxylated glycerol, ethoxylated pentaerythritol (3EO/4OH and 15 EO/4OH from Aldrich Chemicals), ethoxylated trimethyol propane (2.5EO/OH and 20EO/3OH from Aldrich Chemicals), and Lutrol HF-1 (an ethoxylated glycerol from BASF).

Pentaerythritol is a preferred branching agent. Furthermore, if ethoxylated branching agents are used, experimental data suggests that use of polyethylene glycol having an average molecular weight of about 400 g/mol in weight fractions between about 4 percent and 15 percent provides excellent results.

If the total number of reactive sites exceeds four per branching agent molecule, steric hindrance can sometimes prevent full polymerization at the available reactive sites such that more branching agent may be required to achieve the desired mole-equivalent branches. See, e.g., U.S. Pat. Nos. 4,092,299 and 4,113,704 by MacLean and Estes. In preferred embodiments the branching agent is present in the copolyester fiber in an amount between about 0.0036 and 0.0051 mole equivalent branches per mole of standardized polymer (e.g., between about 1300 and 1800 ppm pentaerythritol).

As used herein, the term "mole-equivalent branches" refers to the reactive sites available for chain branching on a molar basis (i.e., the number of reactive sites in excess of the two required to form a linear molecule). For example, pentaerythritol is a tetrafunctional branching agent, so it possesses two available chain branching reactive sites.

In addition, as used herein, the term "standardized polymer" refers to the repeat unit of unmodified polyethylene terephthalate, which has a molecular weight of 192 g/mol. In this regard, it will be understood by those of skill in the art that, for a given total weight of polyethylene terephthalate, polyethylene glycol, and branching agent, increasing the relative weight fraction of polyethylene glycol, which preferably has a molecular weight of less than 5000 g/mol, will decrease total moles. (This is so because the molecular weight of polyethylene terephthalate is less than the molecular weight of the polyethylene glycol.) Consequently, to maintain uniformity across various concentrations and molecular weights of polyethylene glycol, the chain branching agent concentration of between about 0.0014 and 0.0113 mole-equivalent branches per mole of standardized polymer is based on the repeat unit of unmodified polyethylene terephthalate.

In other words, the weight fraction of branching agent should be calculated as if the polymer is made of only unmodified polyethylene terephthalate. Consequently, the weight fraction of polyethylene glycol (e.g., preferably between about 4 weight percent and 20 weight percent) and the molecular weight of the polyethylene glycol (e.g., preferably less than about 5000 g/mol) can be disregarded in calculating mole-equivalent branches per mole of standardized polymer.

For example, an amount of pentaerythritol between about 0.0014 and 0.0113 mole-equivalent branches per mole of the copolyester composition is equivalent to a weight fraction of between about 500 and 4000 ppm when based on the standardized polymer of unmodified polyethylene terephthalate.

To further illustrate this relationship, assume 1000 grams of starting materials—500 ppm pentaerythritol, which has a molecular weight of 136.15 g/mol, and the remainder polyethylene terephthalate. This is equivalent to 0.5 gram pentaerythritol, or 0.00367 moles of pentaerythritol, and 999.5 grams polyethylene terephthalate, or 5.21 moles polyethylene terephthalate repeat units. The mole fraction of pentaerythritol relative to the polyethylene terephthalate is, therefore, 0.0705 mole percent (i.e., 0.00367 moles of pentaerythritol÷5.21 moles polyethylene terephthalate). As noted, pentaerythritol has two available chain branching reactive sites. Thus, the mole-equivalent branches per mole of unmodified polyethylene terephthalate is 0.14 percent (i.e., 0.0014 mole-equivalent branches per mole of standardized polymer.)

The weight fraction corresponding to mole-equivalent branches per mole of standardized polymer can be estimated for any branching agent using the following equation:

$$\text{branching agent (ppm)} = (MEB \div CBRS) \cdot (BAMW \div SPMW) \cdot 10^6,$$

wherein
MEB=mole-equivalent branches per mole of standardized polymer
CBRS=number of available chain branching reactive sites
BAMW=molecular weight of the branching agent (g/mol)
SPMW=192 g/mol-molecular weight of the standardized polymer (i.e., unmodified polyethylene terephthalate).

It will be appreciated by those of skill in the chemical arts that if the mole-equivalent branches were not referenced to a mole of standardized polymer, a branching agent concentration of 0.0014 mole-equivalent branches per mole of polymer (i.e., the copolyester composition) would translate to a slightly lower weight fraction, (i.e., ppm), when a greater polyethylene glycol weight fraction is used, or when polyethylene glycol having a higher average molecular weight is employed.

For example, if mole-equivalent branches per mole of polymer were not related to a common standard, but rather to the actual components of the copolyester composition, a pentaerythritol amount of about 0.0014 mole-equivalent branches per mole of the copolyester composition would be equivalent to a weight fraction of about 450 ppm when based on polyethylene terephthalate that is modified by 20 weight percent polyethylene glycol having an average molecular weight of about 400 g/mol. Likewise, a pentaerythritol amount of about 0.0014 mole-equivalent branches per-mole of the copolyester composition would be equivalent to a weight fraction of less than about 400 ppm when based on polyethylene terephthalate that is modified by 20 weight percent polyethylene glycol having an average molecular weight of about 5000 g/mol. By employing unmodified polyethylene terephthalate as the standardized polymer, however, a pentaerythritol amount of about 0.0014 mole-equivalent branches per mole of standardized polymer is equivalent to a weight fraction of about 500 ppm regardless of the weight fraction or molecular weight of the polyethylene glycol.

As will be understood by those having ordinary skill in the art, copolymerizing polyethylene glycol and branching agent into polyethylene terephthalate is conventionally achieved by reacting ethylene glycol and either terephthalic acid or dimethyl terephthalate in the presence of polyethylene glycol and branching agent. Preferably, the copolymerization of polyethylene glycol and chain branching agent into polyethylene terephthalate yields a copolyester composition that includes polymer chains formed from structural units consisting essentially of diol monomers, non-substituted diacid monomers, and branching agent monomers. Most preferably, the copolymerization of polyethylene glycol and chain branching agent into polyethylene terephthalate yields a copolyester composition that includes polymer chains formed from structural units consisting essentially of diol monomers, aromatic non-substituted diacid monomers, and branching agent monomers. As herein described, such copolyester compositions are preferably formed into copolyester fibers.

The term "diol monomer" as herein used refers to diols, such as ethylene glycol, propylene glycol, and butane diol, as well as ethers that possess terminal alcohols, such as diethylene glycol (DEG). In this regard, polyethylene glycol (polyethylene glycol) is formed from such ethylene glycol monomers and is therefore embraced by the term "diol monomer."

The term "non-substituted diacid monomers" as herein used refers to aromatic non-substituted diacid monomers and aliphatic non-substituted diacid monomers.

The term "aromatic non-substituted diacid monomers" as herein used refers to aromatic carboxylic diacids and diesters, especially terephthalic acid (TA) and its dialkyl ester, dimethyl terephthalate (DMT), whose functional groups are limited to those that facilitate polymer chain growth and that can be used to prepare modified polyethylene terephthalate. Accordingly, "aromatic non-substituted diacid monomers" include single-ringed compounds, such as isophthalic acid and its dialkyl ester (i.e., dimethyl isophthalate), and polycyclic compounds, such as 2,6-naphthalene dicarboxylic acid or its dialkyl ester (i.e., dimethyl 2,6-naphthalene dicarboxylate).

The term "non-substituted aliphatic diacid monomer" as used herein refers to aliphatic carboxylic diacids and diesters, such as adipic acid and its dialkyl (e.g., dimethyl) ester. In this regard, various compounds may be included in copolymerization reactions to impart specific characteristics to the resulting copolymer. Adipic acid, for example, can improve the dyeing characteristics of polyester. Accordingly, the present invention encompasses the copolymerization of polyethylene glycol and chain branching agent into polyethylene terephthalate to yield a copolyester composition that includes polymer chains formed from structural units consisting essentially of diol monomers, non-substituted diacid monomers (i.e., aromatic, aliphatic, or both), and branching agent monomers.

Moreover, it will be understood by those of ordinary skill in the art that the terminal ends of the copolyester chains may be structural units characterized by a lone, chain-propagating reactive site. Such chain terminating groups are within the scope of both the phrase "consisting essentially of diol monomers, non-substituted diacid monomers, and branching agent monomers," and the phrase "consisting essentially of diol monomers, aromatic non-substituted diacid monomers, and branching agent monomers."

In accordance with the invention, copolyester characteristics can be tailored for specific applications by altering the polyethylene glycol content. This permits choice in designing yarns and fabrics made with copolyester or copolyester blends according to the present invention. In this sense, the invention establishes a technology family. For example, the weight fraction and the molecular weight of the polyethylene glycol can be adjusted to produce specific effects, such as wicking, drying, dye rates, stretch, and softness. Similarly, such modifications can improve the dye strike rate and reduce the dye usage. In particular, higher polyethylene glycol fractions, (e.g., greater than about 4 weight percent), result in softer fabrics that wick faster, dry quicker, and dye darker as compared to conventional polyesters.

In practicing the present invention, it is preferred that the polyethylene glycol formulations include sufficient concentrations of antioxidants to prevent formaldehyde generation during spinning operations. For example, the polyethylene glycol used in the development of the present invention includes about 1.36 weight percent of Irganox 245, an antioxidant that is available from Ciba-Geigy. The inclusion of this or similar antioxidants should not adversely affect the products or methods herein described.

In preferred embodiments, the polyethylene glycol is present in the copolyester composition in an amount between about 4 weight percent and 20 weight percent. When amounts of polyethylene glycol greater than about 20 weight percent are present, the resulting copolyester does not polymerize efficiently. Moreover, at such elevated polyethylene glycol fractions, the copolyester composition is difficult to store and transport (e.g., via truck) for it tends to crystallize, which causes undesirable sticking and clumping. For yarns and fabrics within the scope of the invention, polyethylene glycol amounts between about 10 weight percent and 20 weight percent are more preferred, and amounts between about 4 and about 6 weight percent are most preferred. To maximize wickability, polyethylene glycol may be used in amounts between about 15 weight percent and 20 weight percent. In another embodiment, polyethylene glycol is present between about 10 weight percent and 12 weight percent.

Furthermore, while polyethylene glycol with an average molecular weight of less than about 5000 g/mol, (e.g., between about 200 and 5000 g/mol), may be effectively employed, the preferred average molecular weight for polyethylene glycol is between about 300 and 1000 g/mol, most preferably about 400 g/mol.

For consistency in discussing composition and fiber properties, the data herein disclosed refer to copolyester of the present invention that is modified with about 4.5 weight percent polyethylene glycol having a molecular weight of about 400 g/mol and branching agent in an amount of about 0.0036 mole equivalent branches per mole of standardized polymer (e.g., about 13,00 ppm pentaerythritol), unless indicated otherwise.

As known to those familiar with the manufacture of polyester, the equipment used to spin polyester into filaments is designed, built, and adjusted to process polymers whose zero-shear melt viscosity falls within a certain range, typically between about 500 and 4000 poise. Thus, such equipment runs most satisfactorily when the melt viscosity of the copolyester is within this viscosity range. Relatively significant amounts (i.e., more than about 4 weight percent) of polyethylene glycol, however, can suppress melt viscosity, which in turn can hinder spinning productivity.

Thus, the polymerization of polyethylene glycol and branching agent into polyethylene terephthalate continues until the PEG-modified polyester is capable of achieving sufficient melt viscosities for practical processing, and sufficient spinning tensions for a stable and high-throughput commercial process.

According to the present method, copolyester filaments are preferably spun at a temperature between about 260° C. and 300° C. This temperature range comports with that employed in conventional spinning equipment using Dowtherm A vapor heat transfer media, which is available from Dow Chemical Co. Those skilled in the art, however, will recognize that spinning temperatures outside this range may be utilized in conjunction with alternative heat transfer media.

In one preferred embodiment, the method includes copolymerizing between about 4 and 20 weight percent polyethylene glycol and a chain branching agent, usually in an amount between about 0.0014 and 0.0113 mole-equivalent branches per mole of standardized polymer, preferably between about 0.0036 and 0.0051 mole equivalent branches per mole of standardized polymer, into polyethylene terephthalate to form a copolyester composition that achieves a zero-shear melt viscosity of between about 1000 and 3500 poise when heated to 260° C. Thereafter, the composition may be spun into filaments.

Filaments formed according to the invention may be cut into staple fiber. The staple fiber may be then formed into yarns, which may be formed into knitted or woven fabrics, or into nonwoven fabrics. Filaments may also be formed into nonwoven fabrics, typically via spinning the copolyester to form a fibrous web.

As will be understood by those having ordinary skill in this art, the copolyester need not be spun immediately after undergoing melt polymerization. Rather, the copolyester may be formed into chips after the step of copolymerizing polyethylene glycol and a chain branching agent into polyethylene terephthalate in the melt phase and before the step of spinning the copolyester composition into a filament.

The inclusion of PEG-modified copolyester fibers in fabrics improves dyeing characteristics as compared to fabrics formed of an equivalent fraction of conventional, unmodified polyethylene terephthalate fibers. In this regard, it will be understood by those of skill in the art that the polyethylene glycol reduces melt temperature ($T_m$) and glass transition temperature ($T_g$). For example, at a 10 weight percent substitution of polyethylene glycol having a molecular weight of about 400 g/mol, $T_m$ is approximately 238° C. and $T_g$ is approximately 48° C. Consequently, the temperature at which dyes will penetrate the modified polyester structure is lowered.

As used herein, the concept of dyeing copolyester filaments broadly includes dyeing not only uncut filaments (e.g., partially oriented yarns or textured yarns), but also cut filaments (e.g., staple fibers). Moreover, this concept further includes dyeing copolyester fibers that are formed into yarns or fabrics, either alone or in blends with one or more other kinds of fiber (e.g., cotton or spandex fibers).

Accordingly, the present invention facilitates dyeing the copolyester filaments (i.e., any kind of copolyester fiber according to the present invention) at a temperature of less than about 260° F. Above 260° F., fastness may somewhat decrease using certain dyes at high concentrations. In one preferred embodiment, the method includes dyeing the copolyester fibers at a temperature of less than about 250° F. Other embodiments include dyeing the polyester fibers at temperatures less than about 230° F., less than about 220° F., and preferably below the boiling point of water at atmospheric pressure. Thus, the invention is particularly advantageous because performing dye operations below the boiling point of water translates to significant energy savings.

A particular advantage of the present invention is that the disclosed copolyester fibers may be dyed at atmospheric pressure without a carrier (i.e., a dye bath additive that promotes the dyeing of hydrophobic fibers), although leveling and dispersing agents are recommended. Moreover, unlike conventional polyester fibers, which typically require an acidic dye bath adjustment to a pH of about 4–5, the present copolyester fibers do not require any pH modification, although such modification may enhance dye uptake in certain circumstances.

The copolyester fibers formed according to the present invention also possess a high exhaustion rate, which translates to reduced dye costs and fewer environmental issues. A typical exhaustion curve for fibers manufactured according to the invention and incorporating about 4.5 percent polyethylene glycol is shown in FIG. 1. Fibers incorporating greater quantities of polyethylene glycol will exhibit similar curves, but with dye uptake increasing at even lower temperatures.

Example 1 (below) discloses a typical jet dyeing procedure for a woven fabric made according to the invention.

EXAMPLE 1

Fill the jet dyeing machine with 100° F. (38° C.) water and load fabric. Set fabric turn over at about two minutes. Add scour chemicals. Ramp up 5° F. (3° C.) per minute to approximately 180° F. (82° C.) and hold for 15 minutes. Cool down 5° F. (3° C.) per minute to approximately 160° F. (71° C.). Conduct a hot running wash then drain. Fill with water at 120° F. (49° C.) and run five minutes. Drain. Refill with water at 120° F. (49° C.). Add dye bath chemicals. Adjust pH to 4.0 to 5.0 and hold ten minutes. Add pre-dissolved dyes—best results may be obtained with high energy dyes-and hold ten minutes. Ramp up 2° F. (1° C.) per minute to 160° F. (71° C.) and hold 10 minutes. Ramp up 2° F. (1° C.) per minute to 240° F. (116° C.) and hold for 30 minutes. Cool down 3° F. (2° C.) per minute to 160° F. (71° C.). Sample the shade. Wash with hot water for ten minutes and drain. Fill with hot water and hold for five minutes. Drain. Depending upon the shade, run an "after clear" procedure. Unload.

It will be understood by those familiar with dyeing methods, the foregoing dyeing procedure is exemplary and should not be interpreted as limiting the scope of the invention. In this regard, those skilled in the art will recognize that dye bath components and dyestuff selection may impact optimal time/temperature criteria. For example, low energy or high energy dyes may be employed in the practice of the invention.

Another advantage of the present invention is that fibers made according to the invention may be dyed with spandex fibers, which can degrade at high temperatures. The dyeing of such spandex blended fabrics may be acceptable between about 220° F. and 230° F. (104° C. –110° C.).

Alternatively, the fibers of the present invention may be combined with other fibers, such as nylon, and then dyed. If nylon is used as the second fiber, the fiber according to the invention may be formed into a POY and combined with the nylon to form a blended yarn. The blended yarn is then textured and dyed with a disperse dye which selectively dyes the copolyester component, and an acid based dye which selectively dyes the nylon component.

Figure 2:
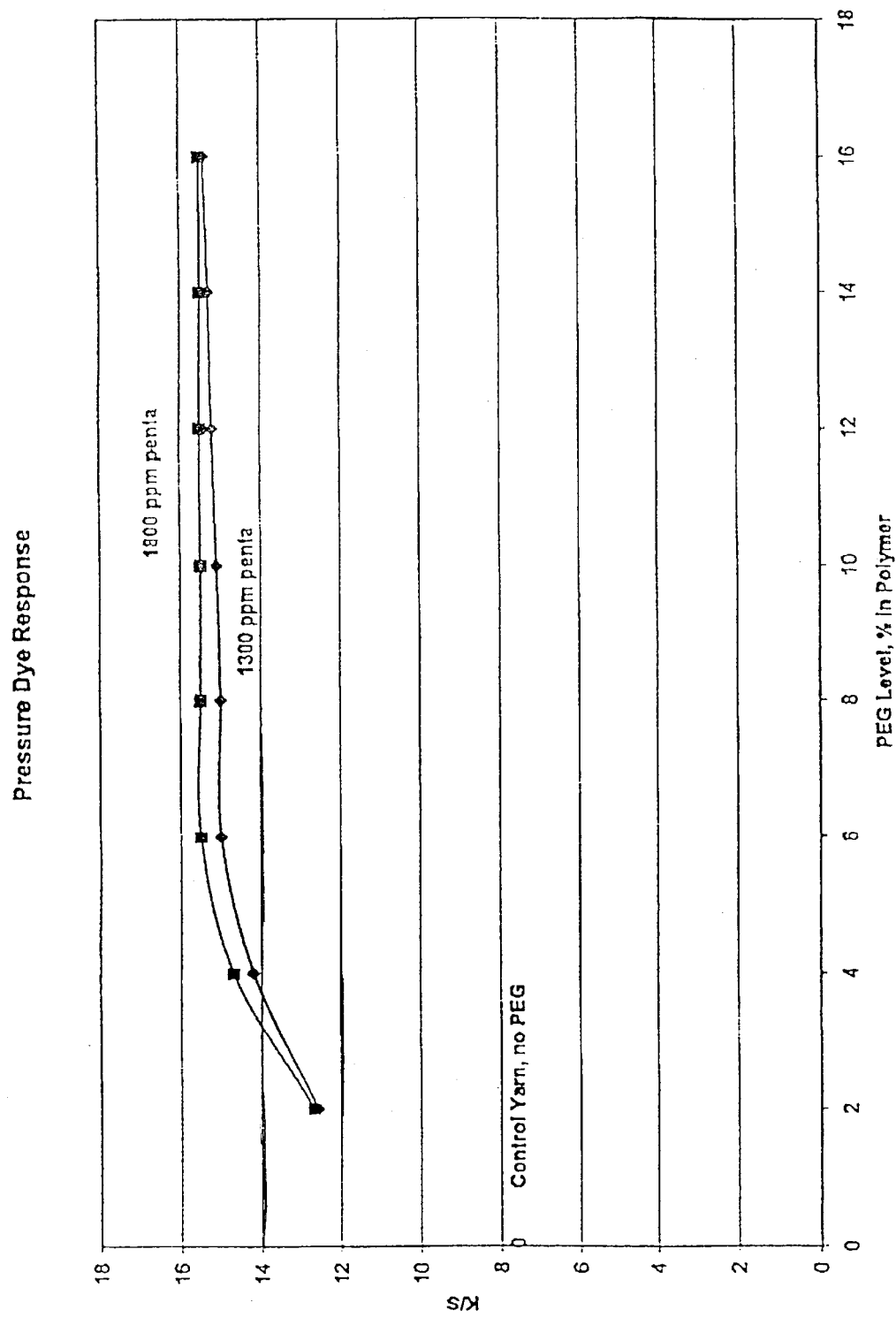
FIG. 2 depicts of dyeing characteristics of polyester fibers according to the present invention.

FIG. 2 is a plot of the Kubelka-Munk (K/S) reflectance value as against present polyethylene glycol in filaments according to the present invention, wherein pentaerythritol is employed as the branching agent. As known to those of ordinary skill in this art, K/S is proportional to colorant concentration in a material. The K/S value can be calculated from the reflectance factor and provides an important and generally well-understood technique for color matching. FIG. 2 plots the K/S value against the percentage of polyethylene glycol in polyester yarns formed according to the present invention at various levels of pentaerythritol. FIG. 2 also shows K/S value for control yarns in otherwise conventional FORTREL® polyester, available from Wellman, Inc. In brief, FIG. 2 illustrates that when the pentaerythritol level is raised to the preferred amounts of 0.0036 to 0.0051 mole equivalent branches per mole of standardized polymer (i.e., 1300 to 1800 ppm of pentaerythritol) the K/S value increases significantly, thus illustrating the greatly enhanced dyeing characteristics of fibers according to the present invention.

A distinct advantage of the present method is that it produces a copolyester fiber possessing wicking, drying, soft hand, dye uptake and stretch properties that are superior to those of conventional polyethylene terephthalate fibers. Even so, the copolyester fiber can be processed using conventional textile equipment. For example, in one broad aspect, the PET-modified copolyester can be spun into partially oriented yarns (POY). As will be understood by those having ordinary skill in the art, POY is often comprised of from tens to hundreds of intermingled filaments (e.g., between 30 and 200) that are extruded from a spinneret at speeds typically between about 2000 and 4000 meters per minute. The POY is then typically drawn to form a drawn yarn, (e.g., by draw texturing, flat drawing, or warp drawing). Thereafter, the drawn yarn is formed into fabric, which is typically finished as well. As will be known by those skilled in the art, texturing POY can be effected in numerous ways, such as air jet texturing, gear crimping, and false-twist texturing. More generally, copolyester fibers of the present invention (i.e., staple or POY) may be textured according to various techniques, such as air jet, edge crimping, false-twist, gear crimping, knit-de-knit, and stuffer box methods.

The method according to the invention encompasses forming yarns and fabrics (e.g., woven, knitted, and nonwoven fabrics) from the copolyester fibers of the present invention. In one embodiment, the method includes forming drawn copolyester yarns into fabrics, and thereafter finishing the fabrics. In another embodiment, the method includes forming the drawn copolyester yarns and a second kind of fiber into a blended yarn or blended fabric. Such additional fibers can include cotton fibers, rayon fibers, acetate fibers, other cellulosic fibers, polypropylene fibers, nylon fibers, spandex fibers, biconstituent fibers, and conventional polyester fibers. As used herein, biconstituent fibers include fibers formed from a homogeneous blend of polymers and a non-homogeneous combination of polymers (e.g., a fiber having a polyester core surrounded by a sheath of polypropylene or low-melt polyester).

One preferred embodiment of the invention encompasses blending fibers made in accordance with the invention with spandex fibers to form fabrics. For example, the copolyester fibers according to the invention and spandex fibers can be blended into yarn. In one preferred embodiment, this includes core spinning copolyester staple fibers around a core of spandex filaments. Likewise, in another preferred embodiment, filaments-preferably in the form of POY-are wrapped around spandex filaments.

Fibers according to the invention and spandex fibers may also be formed into fabric using conventional techniques. For example, the fabric may be formed, (e.g., woven or knitted), from a blended yarn that is spun from the copolyester fibers and spandex fibers. Alternatively, copolyester fibers and spandex fibers may be directly formed into a fabric, preferably a knit fabric. To accomplish this, the spandex is laid into a polyester knit by employing an appropriate knitting machine attachment.

Figure 3:
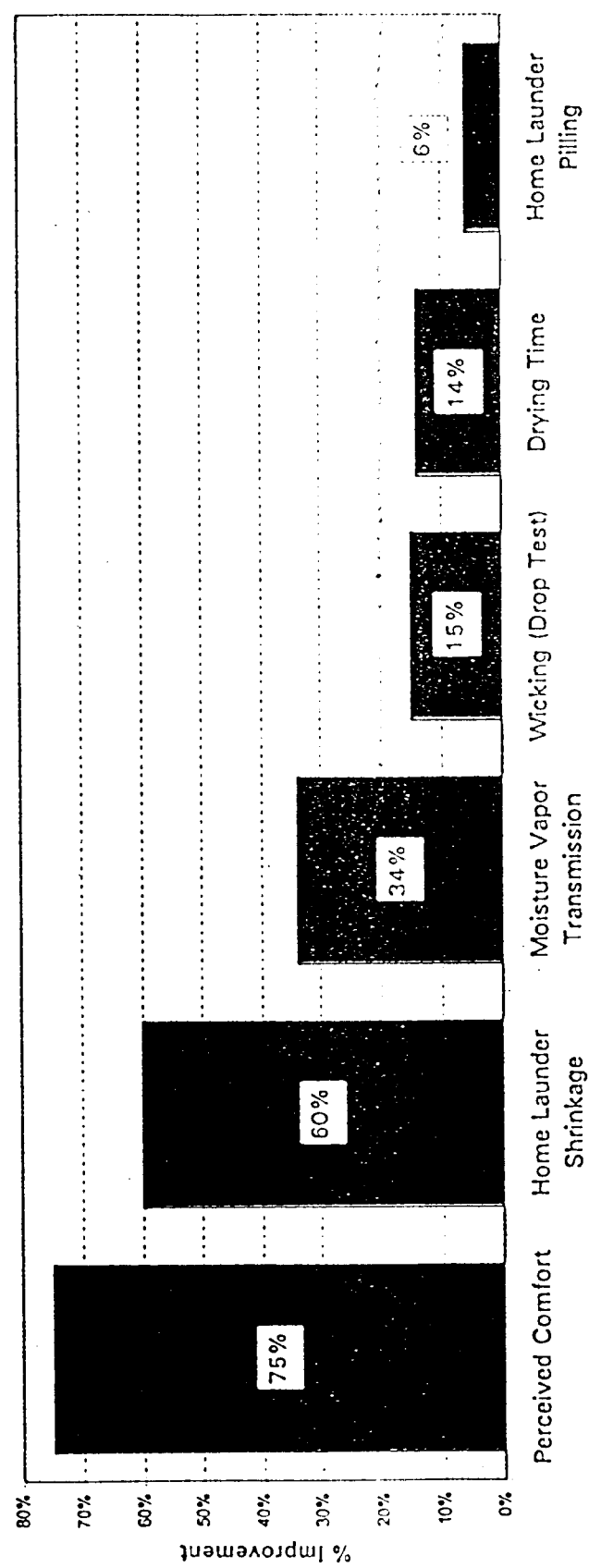
FIG. 3 schematically compares fabrics according to present invention with cotton fabrics.

Fabrics formed according to the invention possess textile properties far superior to those of known fabrics. For example, FIG. 3 graphically illustrates several properties in which knitted fabrics formed according to the present invention exceed those exhibited by cotton fabrics. Perceived comfort was measured by the Ring Friction Force method. Home launder shrinkage was measured using AATCC Method 135. Moisture vapor transmission was measured using ASTM Method E 60. Wicking was measured using AATCC Method 79. Drying time was measured by introducing a fixed amount of water, subjecting the sample to 40° C. and measuring moisture evaporated per second. Home launder pilling was measured by laundering according to AATCC Method 124 and rated according to ASTM Method D3512. It will be understood by those skilled in the art that the results shown in FIG. 1 are exemplary and may vary depending upon fabric construction and processing.

In another embodiment, the invention encompasses a PEG-modified copolyester composition that is particularly well-suited for forming polyester fiber from which exceptionally comfortable fabrics and other textiles are made. Polyethylene terephthalate is present in the copolyester composition in an amount sufficient for a fiber made from the copolyester composition to possess dimensional stability properties substantially similar to those of conventional, unmodified polyethylene terephthalate fibers. Polyethylene glycol is present in an amount sufficient for a fiber made from the copolyester composition to possess wicking properties that are superior to those of conventional, unmodified polyethylene terephthalate fibers. The polyethylene glycol has an average molecular weight of less than about 5000 g/mol, preferably between about 300 g/mol and 1000 g/mol, and more preferably around 400 g/mol. Preferably, the weight fraction of polyethylene glycol in the fiber is between about 4 percent and 20 percent.

As noted previously, a chain branching agent is present in the copolyester composition in an amount less than about 0.0113 mole-equivalent branches per mole of standardized polymer, and more preferably in an amount between about 0.0014 and 0.0113 mole-equivalent branches per mole of standardized polymer, the standardized polymer being unmodified polyethylene terephthalate. Preferably, the copolymer composition is polymerized until the composition achieves a zero-shear melt viscosity of between about 1000 and 3500 poise when heated to 260° C., preferably between about 2000 and 3500 poise.

Likewise, the copolyester fiber is preferably comprised of polymer chains formed from structural units consisting essentially of diol monomers, aromatic non-substituted diacid monomers, and branching agent monomers, such as those discussed previously.

In preferred embodiments, the polyethylene glycol is present in the copolyester composition in an amount between about 4 weight percent and 20 weight percent. When amounts of polyethylene glycol greater than about 20 weight percent are present, the resulting copolyester does not polymerize efficiently. In one preferred embodiment, polyethylene glycol is present in an amount between about 4 and about 6 weight percent. In another preferred embodiment, polyethylene glycol is present in an amount between about 10 weight percent and 12 weight percent. To maximize copolyester fiber wickability, polyethylene glycol may be included in amounts greater than about 10 weight percent, preferably between about 15 and 20 weight percent.

In a particularly preferred embodiment, the weight fraction of polyethylene glycol in the composition is about 4.5 percent and the chain branching agent is present in an amount of about 0.0036 mole equivalent branches per mole of standardized polymer (i.e., about 1300 ppm pentaerythritol). For example, a semi-dull, optically-brightened, 1.3 denier fiber made from such a composition possessed a tenacity of about 3.2 g/denier, a modulus at ten-percent elongation of 2.2. g/denier, an elongation at break of about 55 percent, and hot-air shrinkage at 400° F. of about 8.3 percent.

In another preferred embodiment, the composition according to the invention is spun into filaments having a mean tenacity of less than 3 grams per denier. A tenacity of less than 3 grams per denier accentuates the superior tactility (i.e., soft hand) of the copolyester filament and staple fiber, and reduces the tendency of staple fiber to pill.

Woven, knitted, and nonwoven fabrics incorporating the fibers of this invention are also within the scope of the invention. The yarns and fabrics of the present invention may include, for example, blends of copolyester fibers and other fibers, such as cotton fibers, rayon fibers, acetate fibers, polypropylene fibers, nylon fibers, spandex fibers, biconstituent fibers, and conventional polyester fibers.

In particular, nonwoven fabrics formed from copolyester fibers according to the present invention have been found to provide exceptional moisture management characteristics (e.g., wicking), as compared with conventional nonwoven fabrics of a similar construction. Accordingly, the nonwoven fabrics of the present invention are useful as durable goods, and are especially useful as personal hygiene products, such as disposable diapers, undergarments, or wipes.

As will be understood by those familiar with disposable personal hygiene products, the surge layer in diapers must efficiently wick moisture from skin to an absorbent core. In this regard, nonwoven fabrics formed of 100-percent copolyester fibers of the present invention are superior to nonwoven fabrics formed of 100-percent conventional polyester fibers.

As will also be understood by those familiar with disposable personal hygiene products, disposal wipes must be very absorbent. In this regard, rayon, which is highly absorbent, is preferred. Nonetheless, polyester is often added to rayon blends to increase strength, improve processing performance, and reduce product costs. Unfortunately, including polyester fibers in disposable wipes can inhibit absorbency. As herein discussed, however, the superior wicking of the copolyester fibers according to the present invention will improve the overall absorption rate in 50/50 polyester/rayon blended nonwoven fabrics. This is significant in disposable wipes, where absorbency is so desirable. Without being bound to a particular theory, it is believed that the PEG-modified copolyester fibers facilitate the movement of moisture to the rayon fibers.

The nonwoven fabric of the present invention is further characterized by an improved ability to retain its inherent wicking properties even after several liquid insults, as compared to a nonwoven fabric formed of an equivalent fraction of conventional, unmodified polyethylene terephthalate fibers.

Figure 4:
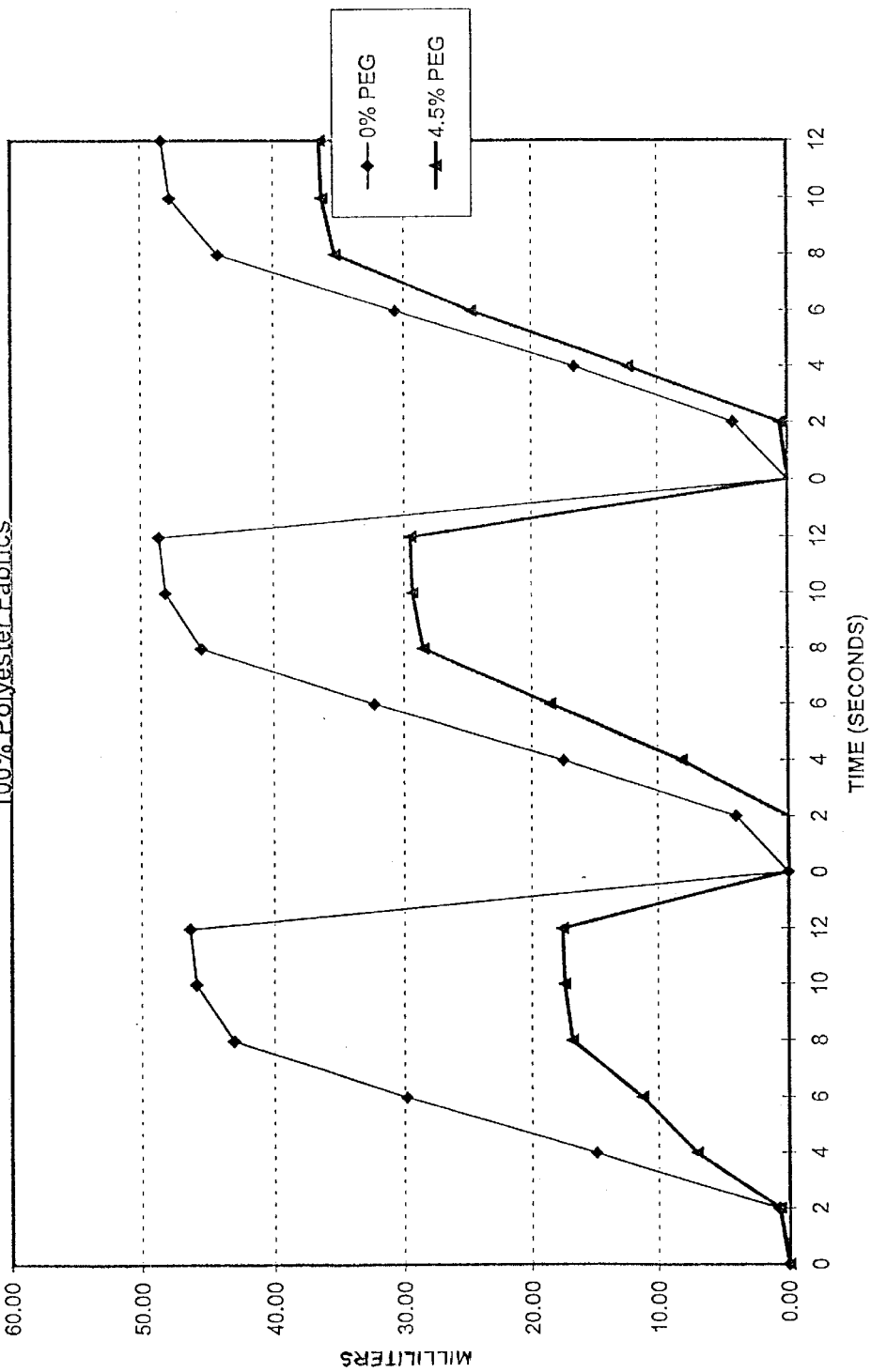
FIG. 4 describes Multiple Insult Liquid Acquisition test results for a nonwoven fabric according to the present invention.

To evaluate performance of the nonwoven fabric according to the present invention, 100 percent polyester nonwoven fabrics were subjected to the Multiple Insult Liquid Acquisition Test at Marketing/Technology Service, Inc., of Kalamazoo, Mich. FIG. 4 compares calendar bonded nonwoven samples according to the present invention (50 grams per square meter and produced from carded webs) with conventional calendar bonded nonwoven samples (50 grams per square meter and produced from carded webs).

More specifically, the modified nonwoven sample according to the present invention was formed from copolyester staple fibers having about 4.5 weight percent polyethylene glycol and about 0.0036 mole equivalent branches per mole of standardized polymer, whereas the conventional nonwoven sample fabric was formed from polyester staple fibers having no polyethylene glycol.

The Multiple Liquid Insult Acquisition Test includes sequentially applying 50 ml dosages of a 0.9 percent saline solution to a horizontal sample, and observing each dosage for 12 seconds. Each nonwoven sample is placed over an industry-standard, super-absorbent core having a basis weight of about 600 grams per square meter. The super-absorbent core essentially provides infinite absorption within the constraints of the Multiple Liquid Insult Acquisition Test.

It is desirable for the surge layer fabric to immediately pass the liquid through to the super-absorbent core with minimal liquid overflow. FIG. 4 depic the amount of liquid overflowing versus time, indicating the amount of liquid that did not successfully make it through to the core. As will be understood by those familiar with diaper technology, low overflow—with delayed onset of overflow—is desirable.

In this regard, the modified product shows appreciably less overflow of liquid when insulted by saline solutions. In FIG. 4, the modified product shows considerably less liquid overflow—and hence appreciably better performance—than does the nonwoven formed from conventional polyester fibers.

Moreover, and as will be understood by those of ordinary skill in the art, a finish may be applied to the nonwoven fabric to complement its inherent wickability. This is a conventional technique to enhance fabric performance, but generally results in nonpermanent enhancement of wicking.

While the nonwoven fabrics may be formed from any conventional technique, calendar bonding, hydroentangling, needlepunching, through-air-bonding, stitch-bonding, melt spun-bonding, and melt blowing are especially preferred. In this regard, where the nonwoven according to the present invention is spun-bonded or melt-blown, techniques that use continuous filaments rather than staple fibers, it is sometimes desirable to enhance the aesthetics of the nonwoven via hydroentangling. Where calendar bonding is employed, the formation of copolyester fibers into a nonwoven fabric includes calendar bonding the copolyester fibers at a temperature of less than about 220° C. Although this is at least about 20° C. below conventional calendar bonding temperatures, fabric strength is maintained.

Figure 5:
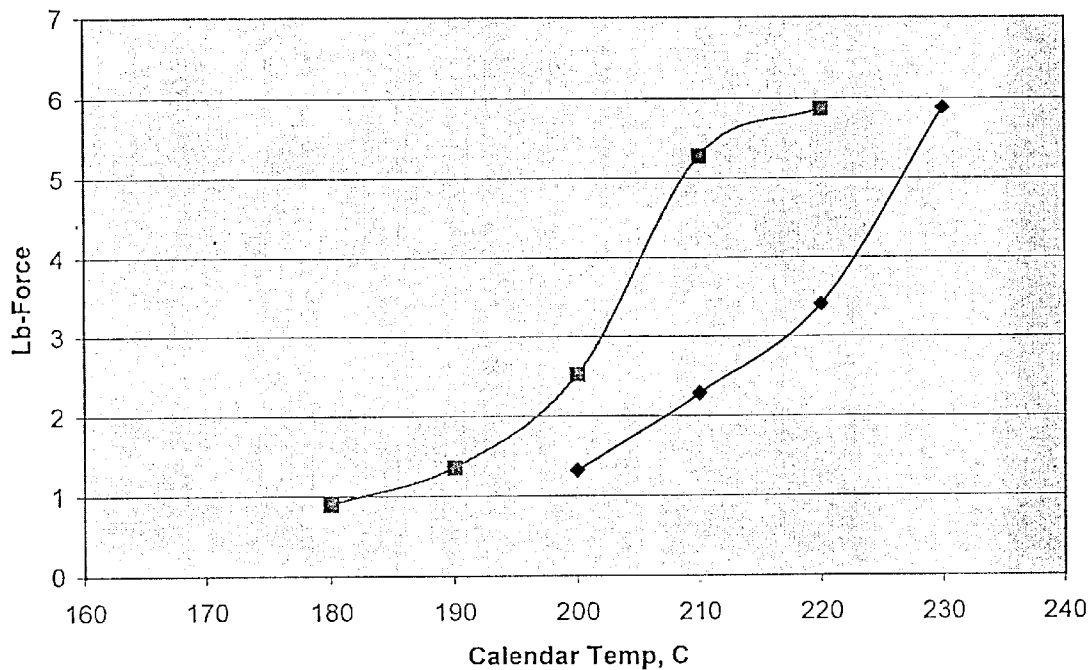
FIGS. 5–6 describe strength properties of a nonwoven fabric according to the present invention as compared to strength properties of a conventional nonwoven fabric.
Figure 6:
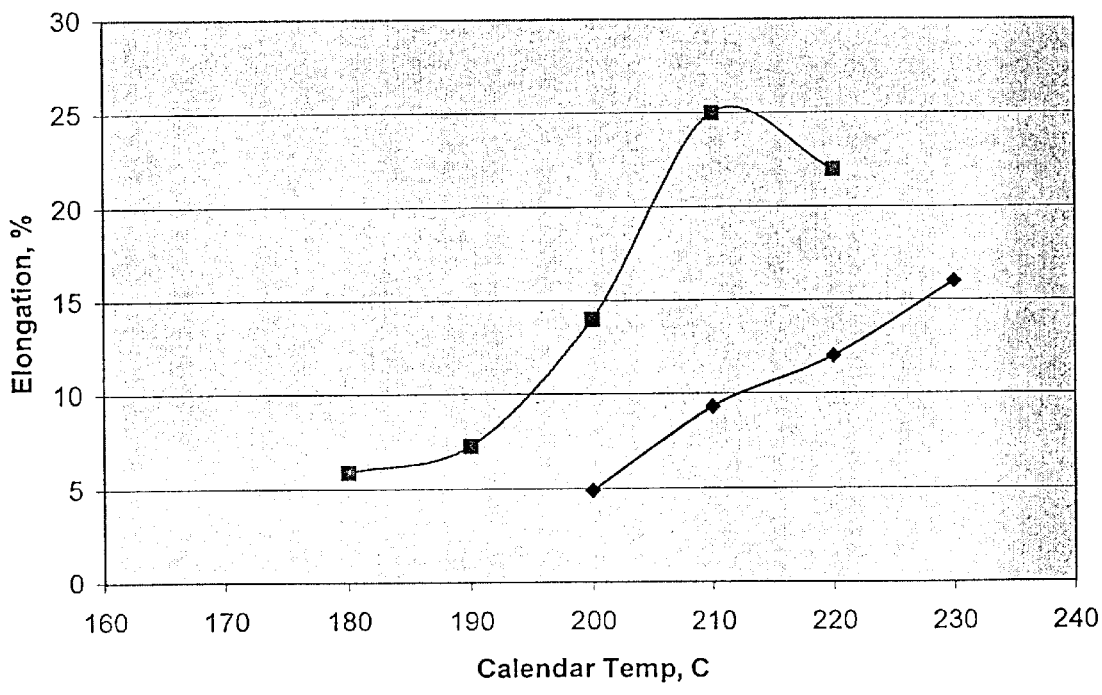

Strength properties of the nonwoven fabric according to the present invention were also evaluated. FIGS. 5 and 6 compare a modified nonwoven sample, which was formed from copolyester staple fibers having about 4.5 weight percent polyethylene glycol and about 0.0036 mole equivalent branches per mole of standardized polymer, with a conventional nonwoven sample fabric that was formed from polyester staple fibers having no polyethylene glycol. One-inch strips of these nonwoven fabrics (50 grams per square meter and produced from carded webs) were tested according to ASTM test procedure D5035-95, "Standard Test Method for Breaking Force and Elongation of Textile Fabrics (Strip Method)." FIGS. 5 and 6 indicate that nonwovens possessing identical strength to conventional polyester nonwovens can be obtained at a reduced bonding temperature (i.e., 15–20° C. less).

Operating at lower bonding temperatures not only offers significant energy savings, but also produces fewer emissions as lower temperatures volatilize less fiber finish. Moreover, more kinds of equipment can be used. For example, polyester fibers typically cannot be processed on equipment configured to bond olefin fibers, which bond at much lower temperatures. Data indicate that equipment that is configured for olefins can be employed to bond polyester fibers without extensive modification.

Figure 7:
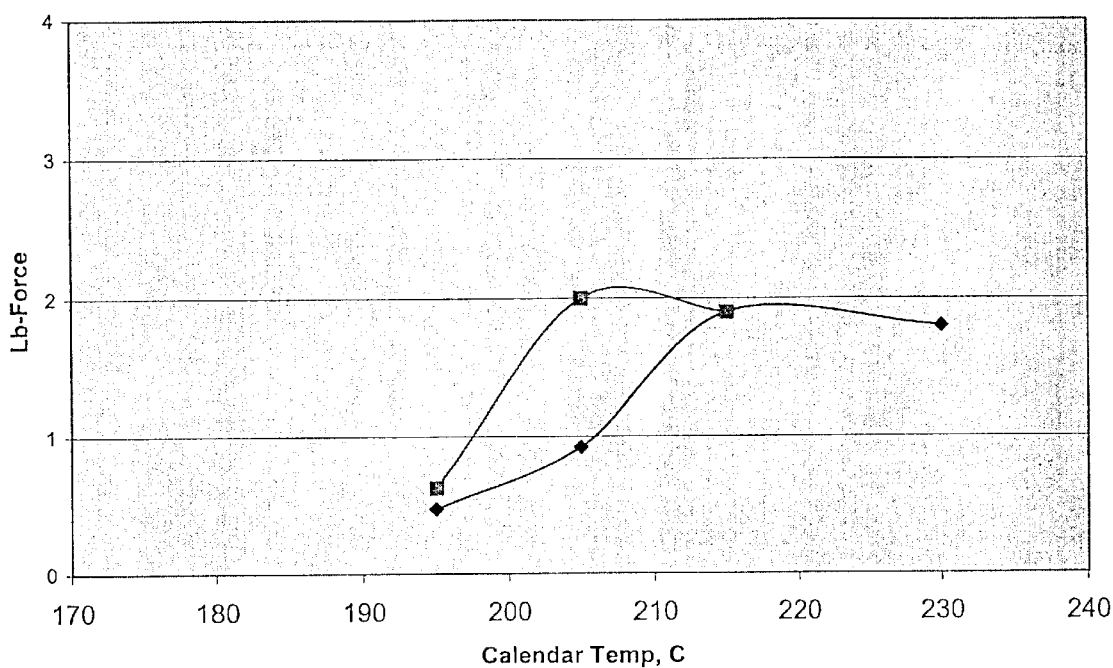
FIGS. 7–8 describe strength properties of a polyester/rayon blended nonwoven fabric according to the present invention.
Figure 8:
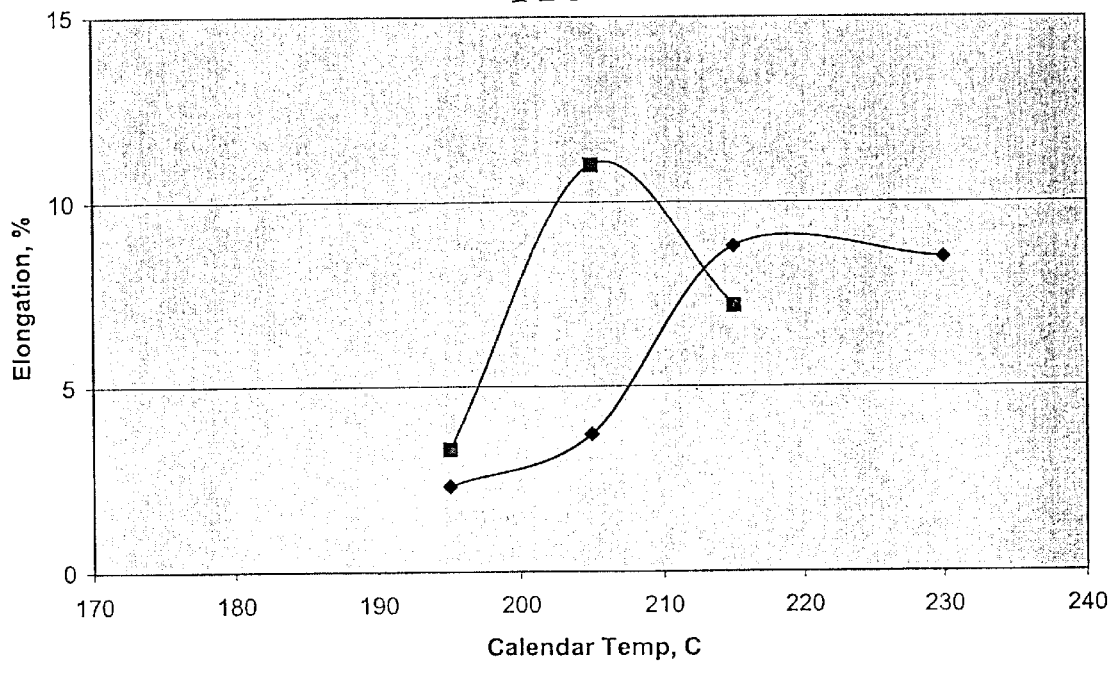

Strength properties of the 50/50 polyester/rayon blended nonwoven fabrics according to the present invention were also evaluated. FIGS. 7 and 8 compare a blended modified nonwoven sample, which was formed from rayon fibers and copolyester staple fibers having about 4.5 weight percent polyethylene glycol and about 0.0036 mole equivalent branches per mole of standardized polymer, with a conventional blended nonwoven sample fabric that was formed from rayon fibers and polyester staple fibers having no polyethylene glycol. One inch strips of these nonwoven fabrics (50 grams per square meter and produced from carded webs) were tested according to ASTM test procedure D5035-95, "Standard Test Method for Breaking Force and Elongation of Textile Fabrics (Strip Method)."

These blended nonwoven samples would probably not be commercially viable without employing a binder fiber. Nevertheless, the comparison shows the better strength and elongation of the blended nonwoven that was formed from rayon fibers and PEG-modified copolyester staple fibers as compared to conventional blends. More specifically, FIGS. 7 and 8 indicate that blended nonwovens according to the present invention are stronger than conventional blended nonwovens.

Moreover to achieve better results, the polyethylene glycol fraction within the copolyester component may be increased. For example, as disclosed in cormonly-assigned, pending application Ser. No. 09/761,446, for Nonwoven Fabrics Formed From Polyethylene Glycol Modified Polyester Fibers And Method For Making The Same, a blended modified nonwoven formed from rayon fibers and copolyester staple fibers having about ten weight percent polyethylene glycol is commercially viable without employing a binder fiber. While that particular blended modified nonwoven included lower fractions of branching agent (i.e., chain branching agent in an amount less than about 0.0014 mole-equivalent branches per mole of standardized polymer), it is thought that branching agent fraction, without more, does not significantly affect strength in nonwovens. As will be known by those familiar with nonwovens, binder fiber is generally expensive and, aside from fabric strength, enhances no meaningful fabric property.

Accordingly, in preferred embodiments, the nonwoven fabric is a blended nonwoven fabric including at least one additional kind of fiber. For example, the copolyester fibers, preferably staple fibers, may be blended with cotton fibers, rayon fibers, acetate fibers, polypropylene fibers, nylon fibers, spandex fibers, biconstituent fibers, or even conventional polyester fibers.

In one preferred embodiment, the nonwoven fabric includes at least cellulosic fibers (e.g., rayon or cotton) in addition to the copolyester fibers, typically staple fibers. The copolyester/cellulosic blends preferably include between about 5 percent and 95 weight percent cellulosic fibers with the remainder comprising the copolyester fibers. Most preferably, the blend includes between about 30 weight percent and 70 weight percent cellulosic fibers with the remainder comprising the copolyester fibers. In particular, nonwoven fabrics having exceptional moisture management properties may be formed from cellulosic fibers, which are present in the nonwoven fabric in an amount sufficient to provide excellent absorbency, and copolyester fibers, which are present in the nonwoven fabric in an amount sufficient to provide excellent wickability. A 50/50 blend of rayon and copolyester has been found to provide excellent properties for wipes and other absorbent articles.

Figure 9:
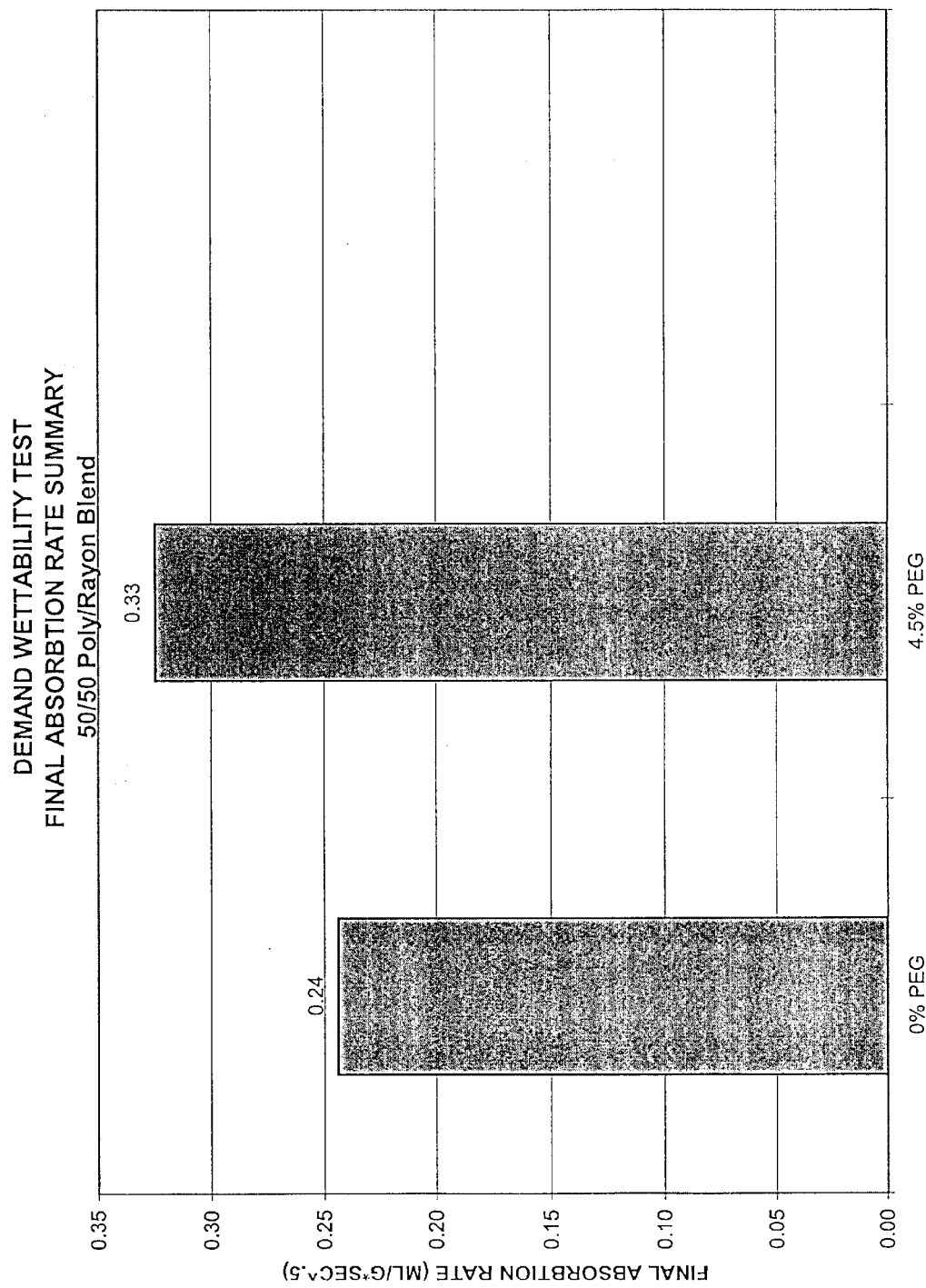
FIG. 9 describes Demand Wettability test results for a nonwoven fabric according to the present invention.

FIG. 9 compares the absorbency rate of a blended modified nonwoven sample, which was formed from rayon fibers and copolyester staple fibers having about 4.5 weight percent polyethylene glycol and about 0.0036 mole equivalent branches per mole of standardized polymer, with the absorbency rate of a conventional blended nonwoven sample fabric that was formed from rayon fibers and polyester staple fibers having no polyethylene glycol.

As depicted in the FIG. 9, the nonwoven according to the present invention offers significantly increased absorbency as compared to the conventional nonwoven. The enhanced wicking characteristics of the present copolyester fibers facilitate the movement of moisture to the highly absorbent rayon. This enables the fabric surface to absorb more liquid.

The combination of significantly enhancing absorbency in rayon blends while achieving sufficient fabric strength during calendar bonding, without resorting to the inclusion of binder fibers, is particularly interesting. For example, a blend of the polyethylene glycol modified polyester staple fibers and highly absorbent fibers may be thermally bonded to form a desirable nonwoven product.

A nonwoven fabric including PEG-modified copolyester fibers and other fibers having low-melt temperatures can be formed by calendar bonding copolyester fibers and low-melt fibers at temperatures well below conventional calendar bonding temperatures. Such low-melt fibers preferably include polypropylene fibers, low-melt polyester fibers, or biconstituent fibers of the same, all of which can be calendar bonded at a temperature of less than about 170° C. Accordingly, in another embodiment, the copolyester nonwoven fabric further includes biconstituent fibers, such as a polyester core surrounded by a sheath of polypropylene or low-melt polyester.

Finally, the improved dyeing characteristics discussed in connection with fibers of previous embodiments are equally applicable with respect to nonwoven fabrics. Nonwoven fabrics of the present invention possess improved dyeing characteristics as compared to nonwoven fabric formed of an equivalent fraction of conventional unmodified polyethylene terephthalate fibers.

The invention has been described in detail, with reference to certain preferred embodiments, in order to enable the reader to practice the invention without undue experimentation. One having ordinary skill in the art will readily recognize, however, that many of the components and parameters may be varied or modified to a certain extent without departing from the scope and spirit of the invention. Furthermore, titles, headings, or the like are provided to enhance the reader's comprehension of this document, and should not be read as limiting the scope of the present invention. Accordingly, only the following claims and reasonable extensions and equivalents define the intellectual property rights to the invention thereof.

That which is claimed is:

1. A polyethylene glycol modified copolyester fiber that can be formed into exceptionally comfortable fabrics, comprising;

polyethylene terephthalate in an amount sufficient for said copolyester fiber to possess dimensional stability properties substantially similar to those of conventional, unmodified polyethylene terephthalate fibers;

polyethylene glycol in an amount sufficient for said copolyester fiber to possess wicking properties that are superior to those of conventional, unmodified polyethylene terephthalate fibers, wherein the polyethylene glycol has an average molecular weight of less than about 5000 g/mol; and chain branching agent in an amount between about 0.0014 and about 0.0113 mole-equivalent branches per mole of standardized polymer, the standardized polymer being unmodified polyethylene terephthalate; and wherein said copolyester fiber has a zero-shear melt viscosity of between about 1000 and about 3500 poise when heated to 260° C.

2. A copolyester fiber according to claim 1, wherein said copolyester fiber is comprised of polymer chains formed from structural units consisting essentially of diol monomers, non-substituted diacid monomers, and branching agent monomers.

3. A copolyester fiber according to claim 2, wherein said non-substituted diacid monomer consists essentially of an aromatic non-substituted diacid monomer.

4. A copolyester fiber according to claim 1, wherein the chain branching agent is present in said copolyester fiber in an amount between about 0.0036 and about 0.0051 mole-equivalent branches per mole of standardized polymer.

5. A copolyester fiber according to claim 1, wherein the weight fraction of the polyethylene glycol in said copolyester fiber is between about 4 percent and about 20 percent.

6. A copolyester fiber according to claim 1, wherein the weight fraction of the polyethylene glycol in said copolyester fiber is between about 4 percent and about 6 percent.

7. A copolyester fiber according to claim 1, wherein the weight fraction of the polyethylene glycol in said copolyester fiber is between about 10 and about 20 percent.

8. A copolyester fiber according to claim 1, wherein the weight fraction of the polyethylene glycol in said copolyester fiber is between 10 percent and 12 percent.

9. A copolyester fiber according to claim 1, wherein the polyethylene glycol has an average molecular weight of between about 300 g/mol and about 1000 g/mol.

10. A copolyester fiber according to claim 1, wherein the polyethylene glycol has an average molecular weight of about 400 g/mol.

11. A copolyester fiber according to claim 1, wherein said copolyester fiber has a mean tenacity of less than 3 grams per denier.

12. A copolyester fiber according to claim 1, wherein said chain branching agent is selected from the group consisting of trifunctional alcohols, trifunctional acids, tetrafunctional alcohols, tetrafunctional acids, pentafunctional alcohols, pentafunctional acids, hexafunctional alcohols, and hexafunctional acids that will copolymerize with polyethylene terephthalate.

13. A copolyester fiber according to claim 1, wherein said chain branching agent is selected from the group consisting of pentaerythritol, dipentaerythritol, trimesic acid, pyromellitic acid, pyromellitic dianhydride, trimellitic acid, trimellitic anhydride, trimethylol propane, ditrimethylol propane, ethoxylated glycerols, ethoxylated pentaerythritol, and ethoxylated trimethylol propane.

14. A copolyester fiber according to claim 1, wherein said copolyester fiber is a staple fiber.

15. A yarn formed from copolyester fibers according to claim 1.

16. A yarn according to claim 15, wherein said yarn is a partially oriented yarn.

17. A yarn according to claim 15, wherein said yarn is a drawn yarn.

18. A yarn according to claim 15, wherein said yarn is a blended yarn further comprising a second kind of fiber selected from the group consisting of cotton fibers, rayon fibers, acetate fibers, polypropylene fibers, nylon fibers, spandex fibers, biconstituent fibers, and conventional polyester fibers.

19. A blended yarn according to claim 18, wherein said copolyester fibers are staple fibers.

20. A blended yarn according to claim 18, wherein said copolyester fibers are in the form of a partially oriented yarn.

21. A blended yarn according to claim 18, wherein said copolyester fibers are in the form of a drawn yarn.

22. A yarn according to claim 15, wherein said yarn is a blended yarn further comprising a nylon fibers.

23. A yarn according to claim 15, wherein said yarn is a blended yarn further comprising cellulosic fibers.

24. A blended yarn according to claim 15, wherein said yarn is a blended yarn further comprising spandex fibers.

25. A blended yarn according to claim 24, wherein
said spandex fibers form a core of spandex filaments; and
said copolyester fibers are staple fibers that surround said spandex filament core.

26. A blended yarn according to claim 24, wherein
said spandex fibers are spandex filaments; and
said copolyester fibers are copolyester filaments that are wrapped around said spandex filaments.

27. A fabric formed from copolyester fibers according to claim 1.

28. A fabric according to claim 27, wherein said fabric further comprises a second kind of fiber selected from the group consisting of cotton fibers, rayon fibers, acetate fibers, polypropylene fibers, nylon fibers, spandex fibers, biconstituent fibers, and conventional polyester fibers.

29. A fabric according to claim 27, wherein said fabric further comprises cellulosic fibers.

30. A fabric according to claim 27, wherein said copolyester fibers are staple fibers.

31. A fabric according to claim 30, wherein said fabric is a knit fabric formed from said staple fibers and spandex fibers that are laid into said knit fabric.

32. A method of dyeing the fabric of claim 27, comprising dyeing the fabric at a temperature of less than about 250° F.

33. A method of dyeing the fabric of claim 27, comprising dyeing the fabric at a temperature of less than about 230° F.

34. A method of dyeing the fabric of claim 27, comprising dyeing the fabric at or below a temperature defined by the boiling point of water at atmospheric pressure.

35. A polyethylene glycol modified copolyester fiber that can be formed into exceptionally comfortable fabrics, comprising:
polyethylene terephthalate in an amount sufficient for said copolyester fiber to possess dimensional stability properties substantially similar to those of conventional, unmodified polyethylene terephthalate fibers;
polyethylene glycol in an amount sufficient for said copolyester fiber to possess wicking properties that are superior to those of conventional, unmodified polyethylene terephthalate fibers, wherein the polyethylene glycol has an average molecular weight of less than about 5000 g/mol; and
chain branching agent in an amount between about 0.0014 and about 0.0113 mole-equivalent branches per mole of standardized polymer, the standardized polymer being unmodified polyethylene terephthalate;
wherein said copolyester fiber is comprised of polymer chains formed from structural units consisting essentially of diol monomers, aromatic non-substituted diacid monomers, and branching agent monomers; and
wherein said copolyester fiber has a zero-shear melt viscosity of between about 1000 and about 3500 poise when heated to 260° C.

36. A copolyester fiber according to claim 35, wherein the weight fraction of the polyethylene glycol in said copolyester fiber is between about 4 percent and about 20 percent.

37. A copolyester fiber according to claim 35, wherein the weight fraction of the polyethylene glycol in said copolyester fiber is between about 4 percent and about 6 percent.

38. A copolyester fiber according to claim 35, wherein the weight fraction of the polyethylene glycol in said copolyester fiber is between about 10 and about 20 percent.

39. A copolyester fiber according to claim 35, wherein the weight fraction of the polyethylene glycol in said copolyester fiber is between 10 percent and 12 percent.

40. A copolyester fiber according to claim 35, wherein the polyethylene glycol has an average molecular weight of between about 300 and about 1000 g/mol.

41. A copolyester fiber according to claim 35, wherein the polyethylene glycol has an average molecular weight of about 400 g/mol.

42. A copolyester fiber according to claim 35, wherein said chain branching agent is selected from the group consisting of pentaerythritol, dipentaerythritol, trimesic acid, pyromellitic acid, pyromellitic dianhydride, trimellitic acid, trimellitic anhydride, trimethylol propane, ditrimethylol propane, ethoxylated glycerols, ethoxylated pentaerythritol, and ethoxylated trimethylol propane.

43. A copolyester fiber according to claim 35, wherein said copolyester fiber has a mean tenacity of less than 3 grams per denier.

44. A yarn formed from copolyester fibers according to claim 35.

45. A fabric formed from copolyester fibers according to claim 35.

46. A nonwoven fabric formed of polyethylene glycol modified copolyester fibers that provide exceptional moisture management characteristics, said copolyester fibers comprising:
polyethylene terephthalate in an amount sufficient for said copolyester fibers to possess dimensional stability properties substantially similar to those of conventional, unmodified polyethylene terephthalate fibers;
polyethylene glycol in an amount sufficient for said copolyester fibers to possess wicking characteristics that are superior to those of conventional, unmodified polyethylene terephthalate fibers; and
chain branching agent in an amount between about 0.0014 and about 0.0113 mole-equivalent branches per mole of standardized polymer, the standardized polymer being unmodified polyethylene terephthalate;
wherein said copolyester fibers have a zero-shear melt viscosity of between about 1000 and about 3500 poise when heated to 2.60° C.

47. A nonwoven fabric according to claim 46, wherein said copolyester fibers comprise polymer chains formed from structural units consisting essentially of diol monomers, non-substituted diacid monomers, and branching agent monomers.

48. A nonwoven fabric according to claim 47, wherein said non-substituted diacid monomer consists essentially of an aromatic diacid monomer.

49. A nonwoven fabric according to claim 46, wherein the weight fraction of the polyethylene glycol in said copolyester fibers is between about 4 percent and about 20 percent.

50. A nonwoven fabric according to claim 46, wherein the weight fraction of the polyethylene glycol in said copolyester fibers is between about 4 percent and about 6 percent.

51. A nonwoven fabric according to claim 46, wherein the weight fraction of the polyethylene glycol in said copolyester fibers is between about 10 percent and about 20 percent.

52. A nonwoven fabric according to claim 46, wherein the weight fraction of the polyethylene glycol in said copolyester fibers is between about 15 percent and about 20 percent.

53. A nonwoven fabric according to claim 46, wherein the polyethylene glycol has an average molecular weight less than about 5000 g/mol.

54. A nonwoven fabric according to claim 46, wherein the polyethylene glycol has an average molecular weight of between about 300 g/mol and about 1000 g/mol.

55. A nonwoven fabric according to claim 46, wherein the polyethylene glycol has an average molecular weight of about 400 g/mol.

56. A nonwoven fabric according to claim 46, wherein said copolyester fibers have a mean tenacity of less than 3 grams per denier.

57. A nonwoven fabric according to claim 46, wherein the chain branching agent is capable of copolymerizing with polyethylene terephthalate, the chain branching agent being selected from the group consisting of trifunctional alcohols, trifunctional acids, tetrafunctional alcohols, tetrafunctional acids, pentafunctional alcohols, pentafunctional acids, hexafunctional alcohols, and hexafunctional acids.

58. A nonwoven fabric according to claim 46, wherein said chain branching agent is selected from the group consisting of pentaerythritol, dipentaerythritol, trimesic acid, pyromellitic acid, pyromellitic dianhydride, trimellitic acid, trimellitic anhydride, trimethylol propane, ditrimethylol propane, ethoxylated glycerols, ethoxylated pentaerythritol, and ethoxylated trimethylol propane.

59. A nonwoven fabric according to claim 46, wherein the chain branching agent consists essentially of pentaerythritol that is present in said copolyester fibers in an amount between about 500 and about 4000 ppm.

60. A nonwoven fabric according to claim 46 wherein the chain branching agent is present in said copolyester fibers in an amount between about 0.0036 and about 0.0051 mole-equivalent branches per mole of standardized polymer.

61. A nonwoven fabric according to claim 46, wherein the nonwoven fabric possesses improved wicking characteristics as compared to a nonwoven fabric formed of a similar percentage of conventional, unmodified polyethylene terephthalate fibers.

62. A nonwoven fabric according to claim 46, wherein the nonwoven fabric is a calendar-bonded nonwoven fabric.

63. A nonwoven fabric according to claim 46, wherein the nonwoven fabric is a hydroentangled nonwoven fabric.

64. A nonwoven fabric according to claim 46, wherein the nonwoven fabric is a through-air-bonded nonwoven fabric.

65. A nonwoven fabric according to claim 46, wherein the nonwoven fabric is a needlepunched nonwoven fabric.

66. A nonwoven fabric according to claim 46, wherein the nonwoven fabric is a stitch-bonded nonwoven fabric.

67. A nonwoven fabric according to claim 46, wherein the nonwoven fabric is a melt spun-bonded nonwoven fabric.

68. A nonwoven fabric according to claim 46, wherein the nonwoven fabric is a melt-blown nonwoven fabric.

69. A disposable wipe comprising the nonwoven fabric of claim 46.

70. A disposable undergarment comprising the nonwoven fabric of claim 46.

71. A durable good comprising the nonwoven fabric of claim 46, said durable good possessing the appearance and performance of a traditional textile good.

72. A nonwoven fabric according to claim 46, wherein said nonwoven fabric is a blended nonwoven fabric comprising a second kind of fiber.

73. A nonwoven fabric according to claim 72, wherein said second kind of fiber is selected from the group consisting of cotton fibers, rayon fibers, acetate fibers, polypropylene fibers, nylon fibers, spandex fibers, and conventional polyester fibers.

74. A nonwoven fabric according to claim 72, wherein said second kind of fiber comprises cellulosic fibers.

75. A nonwoven fabric according to claim 74, wherein the cellulosic fibers comprise rayon fibers that are present in the nonwoven fabric in an amount sufficient to provide excellent absorbency, and the copolyester fibers are present in the nonwoven fabric in an amount sufficient to provide excellent wickability.

76. A nonwoven fabric according to claim 72, wherein said second kind of fiber comprises biconstituent fibers.

77. A nonwoven fabric according to claim 76, wherein the biconstituent fibers comprise a polyester core surrounded by a sheath of either polypropylene or low-melt polyester.

78. A nonwoven fabric according to claim 72, wherein the nonwoven fabric possesses an improved ability to retain its wicking characteristics even after several liquid insults, as compared to a nonwoven fabric formed of an equivalent fraction of conventional, unmodified polyethylene terephthalate fibers.

79. A nonwoven fabric according to claim 72, wherein the nonwoven fabric possesses improved dyeing characteristics as compared to a nonwoven fabric formed of an equivalent fraction of conventional, unmodified polyethylene terephthalate fibers.

80. A polyethylene glycol modified copolyester composition that is particularly suitable for fibers, comprising:
polyethylene terephthalate in an amount sufficient for a fiber made from said composition to possess dimensional stability properties substantially similar to those of conventional, unmodified polyethylene terephthalate fibers;
polyethylene glycol in an amount sufficient for a fiber made from said composition to possess wicking properties that are superior to those of conventional, unmodified polyethylene terephthalate fibers, wherein the polyethylene glycol has an average molecular weight of less than about 5000 g/mol; and
chain branching agent selected from the group consisting of trifunctional alcohols, trifunctional acids, tetrafunctional alcohols, tetrafunctional acids, pentafunctional alcohols, pentatunctional acids, hexatunctional alcohols, and hexafunctional acids that will copolymerize with polyethylene terephthalate, wherein the chain branching agent is present in said composition in an amount between about 0.0014 and about 0.0113 mole-equivalent branches per mole of standardized polymer, the standardized polymer being unmodified polyethylene terephthalate; and
wherein said composition is comprised of polymer chains formed from structural units consisting essentially of diol monomers, non-substituted diacid monomers, and branching agent monomers; and
wherein said composition achieves a zero-shear melt viscosity of between about 1000 and about 3500 poise when to 260° C.

81. A polyester composition according to claim 80, wherein said non-substituted diacid monomer consists essentially of an aromatic diacid monomer.

82. A copolyester composition according to claim 80, wherein the chain branching agent is present in the copolyester composition in an amount between about 0.0036 and about 0.0051 mole-equivalent branches per mole of standardized polymer.

83. A copolyester composition according to claim 80, wherein the polyethylene glycol has an average molecular weight of between about 300 g/mol and about 1000 g/mol.

84. A copolyester composition according to claim 80, wherein the polyethylene glycol has an average molecular weight of about 400 g/mol.

85. A copolyester composition according to claim 80, wherein said composition achieves a zero-shear melt viscosity of between about 2000 and about 3500 poise when heated to 260° C.

86. A copolyester composition according to claim 80, wherein the chain branching agent is selected from the group consisting of pentaerythritol, dipentaerythritol, trimesic acid, pyromellitic acid, pyromellitic dianhydride, trimellitic acid, trimellitic anhydride, trimethylol propane, ditrimethylol propane, ethoxylated glycerols, ethoxylated pentaerythritol, and ethoxylated trimethylol propane.

87. A copolyester fiber formed from said composition according to claim 80.

88. A copolyester chip formed from said composition according to claim 80.

89. A method of preparing polyethylene glycol modified copolyester fibers that can be formed into exceptionally comfortable fabrics, comprising:
copolymerizing polyethylene glycol and a chain branching agent into polyethylene terephthalate in the melt phase to form a copolyester composition that achieves a zero-shear melt viscosity of between about 1000 and about 3500 poise when heated to 260° C.;
wherein the polyethylene terephthalate is present in the copolyester composition in an amount sufficient for a fiber made from the copolyester composition to possess dimensional stability properties substantially similar to those of conventional, unmodified polyethylene terephthalate fibers;
wherein the polyethylene glycol has an average molecular weight of less than about 5000 g/mol and is present in an amount sufficient for a fiber made from the copolyester composition to possess wicking properties that are superior to those of conventional, unmodified polyethylene terephthalate fibers; and
wherein the chain branching agent is present in the copolyester composition in an amount between about 0.0014 and about 0.0113 mole-equivalent branches per mole of standardized polymer, the standardized polymer being unmodified polyethylene terephthalate; and
thereafter spinning the copolyester composition into a filament.

90. A method of preparing copolyester fibers according to claim 89, wherein the step of copolymerizing polyethylene glycol and a chain branching agent into polyethylene terephthalate yields a copolyester composition that is comprised of polymer chains formed from structural units consisting essentially of diol monomers, non-substituted diacid monomers, and branching agent monomers.

91. A method of preparing copolyester fibers according to claim 89, wherein the non-substituted diacid monomer consists essentially of aromatic non-substituted diacid monomers.

92. A method of preparing copolyester fibers according to claim 89, wherein the weight fraction of polyethylene glycol in the copolyester composition is between about 4 percent and about 20 percent.

93. A method of preparing copolyester fibers according to claim 89, wherein the weight fraction of polyethylene glycol in the copolyester composition is between about 4 percent and about 6 percent.

94. A method of preparing copolyester fibers according to claim 89, wherein the weight fraction of polyethylene glycol in the copolyester composition is between 10 percent and 20 percent.

95. A method of preparing copolyester fibers according to claim 89, wherein the copolyester composition achieves a zero-shear melt viscosity of between about 2000 and about 3500 poise when heated to 260° C.

96. A method of preparing copolyester fibers according to claim 89, wherein the polyethylene glycol has an average molecular weight of between about 300 g/mol and about 1000 g/mol.

97. A method of preparing copolyester fibers according to claim 89, wherein the polyethylene glycol has an average molecular weight of about 400 g/mol.

98. A method of preparing copolyester fibers according to claim 89, wherein the chain branching agent is present in the copolyester composition in an amount between about 0.0036 and about 0.0051 mole-equivalent branches per mole of standardized polymer.

99. A method of preparing copolyester fibers according to claim 89, wherein the step of spinning filaments from the copolyester comprises spinning copolyester filaments at a temperature between about 240° C. and about 300° C.

100. A method of preparing copolyester fibers according to claim 89, further comprising the step of forming the copolyester into chips after the step of copolymerizing polyethylene glycol and a chain branching agent into polyethylene terephthalate in the melt phase and before the step of spinning the copolyester composition into a filament.

101. A method of preparing copolyester fibers according to claim 89, wherein the step of spinning the copolyester composition into a filament comprises spinning filaments having a mean tenacity of less than 3 grams per denier.

102. A method of preparing copolyester fibers according to claim 89, wherein the chain branching agent is selected from the group consisting of pentaerythritol, dipentaerythritol, trimesic acid, pyromellitic acid, pyromellitic dianhydride, trimellitic acid, trimellitic anhydride, trimethylol propane, ditrimethylol propane, ethoxylated glycerols, ethoxylated pentaerythritol, and ethoxylated trimethylol propane.

103. A method of preparing copolyester fibers according to claim 89, wherein:
the chain branching agent is pentaerythritol; and
the pentaerythritol is present in the copolyester composition in an amount between about 500 ppm and about 4000 ppm.

104. A method for producing copolyester fibers according to claim 89, further comprising dyeing the copolyester filament at a temperature of less than about 250° F.

105. A method for producing copolyester fibers according to claim 104, wherein the step of dyeing the copolyester filament at a temperature of less than about 250° F. comprises dyeing the copolyester filament at a temperature of less than about 230° F.

106. A method for producing copolyester fibers according to claim 105, wherein the step of dyeing the copolyester filament at a temperature of less than about 230° F. comprises dyeing the copolyester filament at or below a temperature defined by the boiling point of water at atmospheric pressure.

107. A method for producing copolyester fibers according to claim 89, wherein the step of spinning a filament from the copolyester comprises spinning POY from the copolyester.

108. A method for producing copolyester fibers according to claim 107, further comprising drawing the POY to form drawn yarn.

109. A method for producing copolyester fibers according to claim 108, further comprising:
forming the drawn yarn into a fabric; and
finishing the fabric.

110. A method for producing copolyester fibers according to claim 108, further comprising forming the drawn yarn and a second kind of fiber into a blended yarn.

111. A method for producing copolyester fibers according to claim 110, wherein the second kind of fiber is selected from the group consisting of cotton fibers, rayon fibers, acetate fibers, polypropylene fibers, nylon fibers, spandex fibers, conventional polyester fibers, and copolyester staple fibers.

112. A method for producing copolyester fibers according to claim 108, further comprising forming the drawn yarn and a second kind of fiber into a fabric.

113. A method for producing copolyester fibers according to claim 112, wherein the second kind of fiber is selected from the group consisting of cotton fibers, rayon fibers, polypropylene fibers, acetate fibers, nylon fibers, spandex fibers, conventional polyester fibers, and copolyester staple fibers.

114. A method for producing copolyester fibers according to claim 107, further comprising:
forming the POY and a nylon yarn into a blended yarn;
texturing the blended yarn; and
dyeing the blended yarn with a disperse dye, which selectively dyes the copolyester component, and an acid-based dye, which selectively dyes the nylon component.

115. A method of preparing copolyester fibers according to claim 89, further comprising forming the copolyester filament into a nonwoven fabric.

116. A method of preparing copolyester fibers according to claim 89, further comprising cutting the copolyester filament into staple fibers.

117. A method for producing copolyester fibers according to claim 116, further comprising forming the staple fibers into yarn.

118. A method for producing copolyester fibers according to claim 116, further comprising forming the staple fibers into fabric.

119. A method for producing copolyester fibers according to claim 118, wherein the step of forming the staple fibers into fabric comprises forming the staple fibers into a nonwoven fabric.

120. A method for producing copolyester fibers according to claim 116, further comprising forming the copolyester staple fibers and a second kind of fiber into a blended yarn.

121. A method for producing copolyester fibers according to claim 120, wherein the second kind of fiber is selected from the group consisting of cotton fibers, rayon fibers, acetate fibers, polypropylene fibers, nylon fibers, spandex fibers, biconstituent fibers, and conventional polyester fibers.

122. A method for producing copolyester fibers according to claim 116, further comprising forming the copolyester staple fibers and a second kind of fiber into a fabric.

123. A method for producing copolyester fibers according to claim 122, wherein the second kind of fiber is selected from the group consisting of cotton fibers, rayon fibers, acetate fibers, polypropylene fibers, nylon fibers, spandex fibers, and conventional polyester fibers.

124. A method for producing copolyester fibers according to claim 122, wherein the step of forming the staple fibers and a second kind of fiber into fabric comprises forming the staple fibers and a second kind of fiber into a nonwoven fabric.

125. A method for producing copolyester fibers according to claim 124, wherein the second kind of fiber is a cellulosic fiber.

126. A method of preparing polyethylene glycol modified copolyester fibers that can be formed into exceptionally comfortable fabrics, comprising:
copolymerizing polyethylene glycol and a chain branching agent into polyethylene terephthalate in the melt phase to form a copolyester composition that achieves a zero-shear melt viscosity of between about 1000 and about 3500 poise when heated to 260° C.;
wherein the polyethylene terephthalate is present in the copolyester composition in an amount sufficient for a fiber made from the copolyester composition to possess dimensional stability properties substantially similar to those of conventional, unmodified polyethylene terephthalate fibers;
wherein the polyethylene glycol has an average molecular weight of less than about 5000 g/mol and is present in an amount sufficient for a fiber made from the copolyester composition to possess wicking properties that are superior to those of conventional, unmodified polyethylene terephthalate fibers; and wherein the chain branching agent is present in the copolyester composition in an amount between about 0.0014 and about 0.0113 mole-equivalent branches per mole of standardized polymer, the standardized polymer being unmodified polyethylene terephthalate;

thereafter forming copolyester fibers from the copolyester composition;

blending the copolyester fibers with spandex fibers; and dyeing the blended copolyester fibers and the spandex fibers at a temperature of less than about 240° F.

127. A method for producing copolyester fibers according to claim 126, wherein the step of dyeing the blended copolyester fibers and spandex fibers at a temperature of less than about 240° F. comprises dyeing the blended copolyester fibers and spandex fibers at a temperature of less than about 220° F.

128. A method for producing copolyester fibers according to claim 127, wherein the step of dyeing the blended copolyester fibers and spandex fibers at a temperature of less than about 220° F. comprises dyeing the blended copolyester fibers and spandex fibers at or below a temperature defined by the boiling point of water at atmospheric pressure.

129. A method for producing copolyester fibers according to claim 126, further comprising forming the copolyester fibers and the spandex fibers into yarn.

130. A method for producing copolyester fibers according to claim 129, wherein the step of forming the copolyester fibers and the spandex fibers into yarn comprises core spinning copolyester staple fibers around a core of spandex filaments.

131. A method for producing copolyester fibers according to claim 129, wherein the step of forming the copolyester fibers and the spandex fibers into yarn comprises wrapping copolyester filaments around spandex filaments.

132. A method for producing copolyester fibers according to claim 126, further comprising forming the copolyester fibers and the spandex fibers into fabric.

133. A method for producing copolyester fibers according to claim 132, wherein the step of forming the copolyester fibers and the spandex fibers into fabric comprises laying the spandex fibers into a knit fabric.

* * * * *

UNITED STATES PATENT AND TRADEMARK OFFICE
CERTIFICATE OF CORRECTION

PATENT NO. : 6,623,853 B2
DATED : September 23, 2003
INVENTOR(S) : Branum et al.

It is certified that error appears in the above-identified patent and that said Letters Patent is hereby corrected as shown below:

<u>Title page,</u>
Item [74], *Attorney, Agent, or Firm*, "Rallan" should read -- & Allan --.

<u>Column 1,</u>
Line 14, "Sane" should read -- Same --.

<u>Column 2,</u>
Line 59, "filameent" should read -- filament --.

<u>Column 6,</u>
Line 52, "pinning" should read -- spinning --.

<u>Column 8,</u>
Line 47, "ditrimethytlol" should read -- ditrimethylol --.
Line 52, "trimethyol" should read -- trimethylol --.

<u>Column 17,</u>
Line 58, "depic" should read -- depicts --.

<u>Column 19,</u>
Line 3, "cormonly" should read -- commonly --.

<u>Column 21,</u>
Line 21, "t hat" should read -- that --.

<u>Column 23,</u>
Line 27, "2.60°" should read -- 260° --.

<u>Column 25,</u>
Line 22, "pentatunctional" should read -- pentafunctional --.
Line 22, "hexatunctional" should read -- hexafunctional --.
Line 36, after "when" insert -- heated --.

<u>Column 26,</u>
Line 5, please delete ".".
Line 67, after "240° C" please delete ".".

UNITED STATES PATENT AND TRADEMARK OFFICE
CERTIFICATE OF CORRECTION

PATENT NO. : 6,623,853 B2
DATED : September 23, 2003
INVENTOR(S) : Branum et al.

It is certified that error appears in the above-identified patent and that said Letters Patent is hereby corrected as shown below:

<u>Column 27,</u>
Line 30, please delete ".".
Line 35, please delete ".".

<u>Column 28,</u>
Line 55, please delete ".".

<u>Column 29,</u>
Line 14, please delete ".".
Line 20, please delete ".".

Signed and Sealed this

Twentieth Day of January, 2004

JON W. DUDAS
*Acting Director of the United States Patent and Trademark Office*